United States Patent
Girouard, Sr. et al.

[19]

[11] Patent Number: 5,813,103
[45] Date of Patent: Sep. 29, 1998

[54] CROSS-TIE PRE-PLATING SYSTEM

[75] Inventors: Gerald David Girouard, Sr., New Iberia; Gerald David Girouard, Jr., Lafayette; Donald Darcey, New Iberia, all of La.

[73] Assignee: Coastal Timbers, Inc., New Iberia, La.

[21] Appl. No.: 665,670

[22] Filed: Jun. 20, 1996

Related U.S. Application Data

[63] Continuation-in-part of Ser. No. 300,749, Sep. 6, 1994, Pat. No. 5,528,807, and a continuation of Ser. No. 207,118, Feb. 28, 1994, Pat. No. 5,343,606, and a continuation of Ser. No. 85,400, Jun. 30, 1993.

[51] Int. Cl.$^6$ ........................................... E01B 29/32
[52] U.S. Cl. .............................. 29/33 K; 29/798; 104/16
[58] Field of Search ................................ 29/33 K, 564.1, 29/787, 795, 798, 464, 466, 468; 104/16, 17.1

[56] References Cited

U.S. PATENT DOCUMENTS 3,701,320  10/1972  Fearon et al. ............................ 104/16
5,343,606   9/1994  Girourard, Sr. et al. ............... 29/33 K
5,528,807   6/1996  Girouard, Jr. et al. ................ 29/33 K

*Primary Examiner*—Daniel W. Howell
*Attorney, Agent, or Firm*—Joseph T. Regard, Ltd.

[57] ABSTRACT

A machine for fastening rail plates to cross-ties, utilizing spikes or the like, and method therefore, is disclosed in the present invention. The preferred apparatus of the present invention teaches a system wherein there is provided a conveyor for conveying a plurality of laterally arranged, juxtaposed ties in bulk, a loader or retriever for loading a single tie upon a template conveyer, and a positioner for positioning the single tie during the pre-plating process. The present invention further includes a template system for securing the cross-tie or tie in place, feeding and positioning the rail-plate in place, feeding, dispensing, and positioning the spikes in place, driving the spikes, and discharging the processed tie, the template system utilizing as a principle motive force the displacement of the template reciprocating drive piston for positioning the template, as well as dispensing the plates.

11 Claims, 27 Drawing Sheets

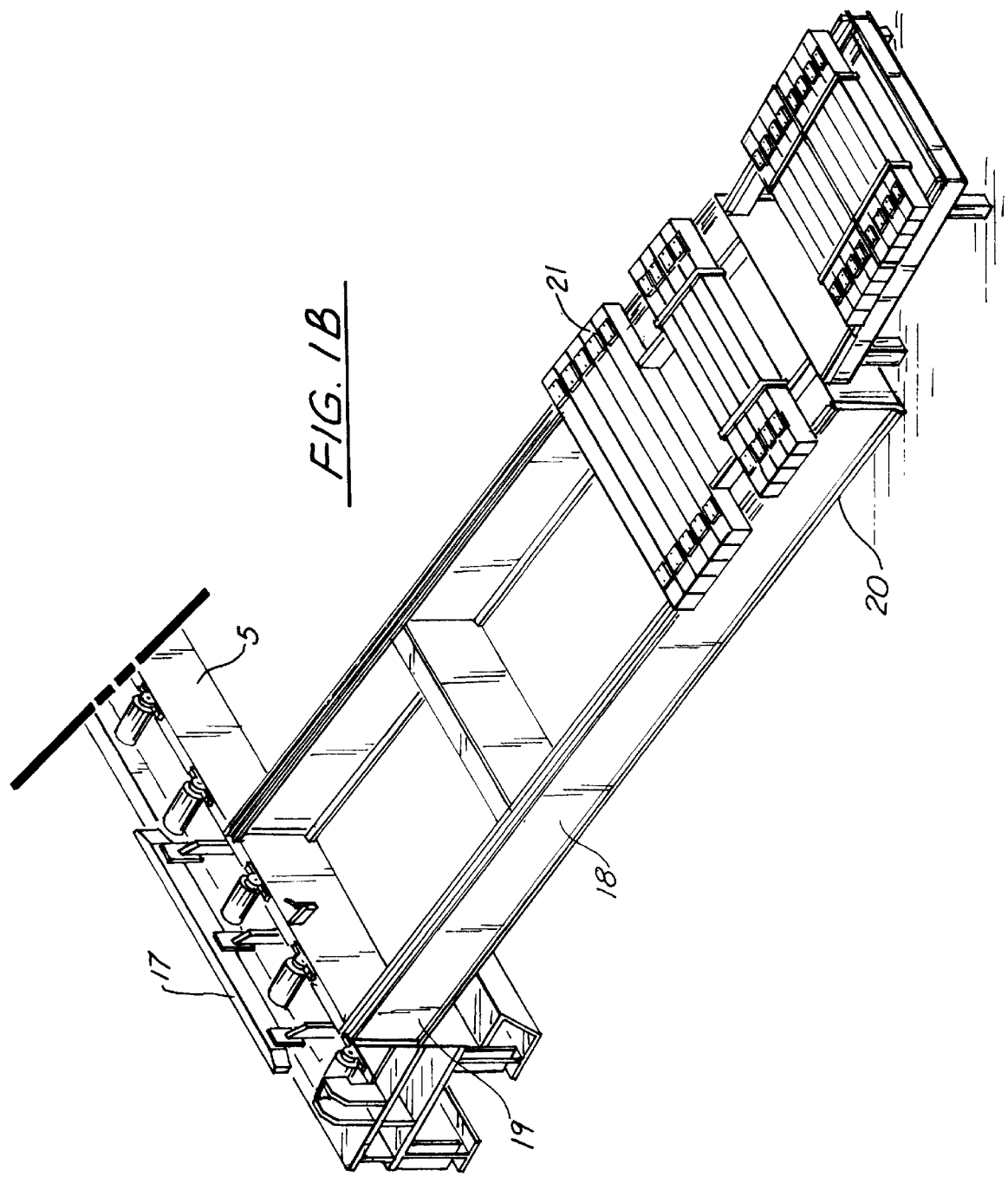

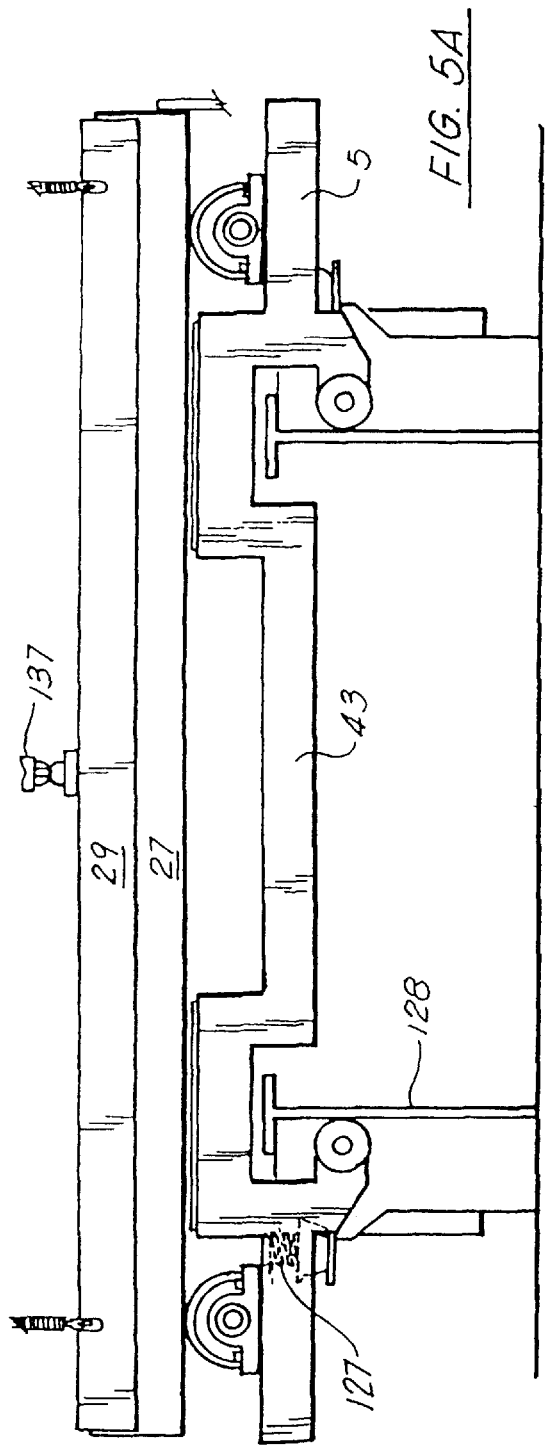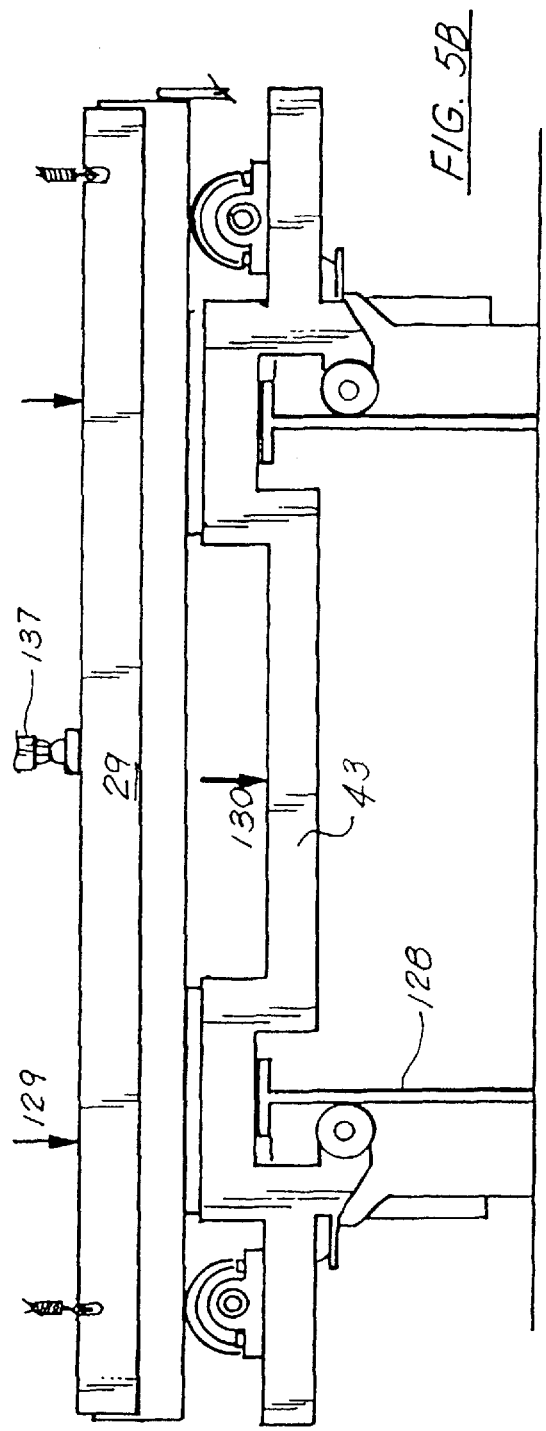

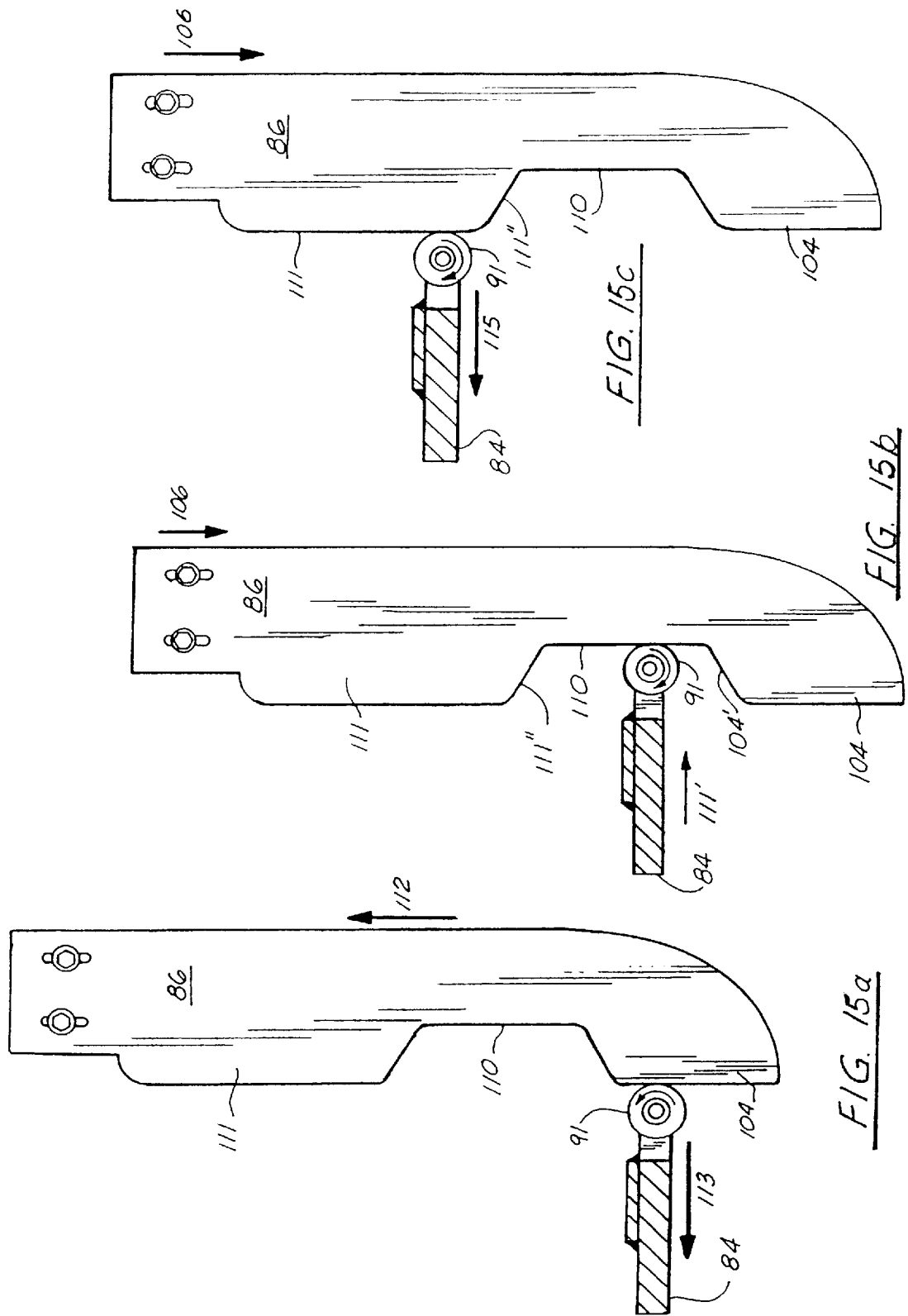

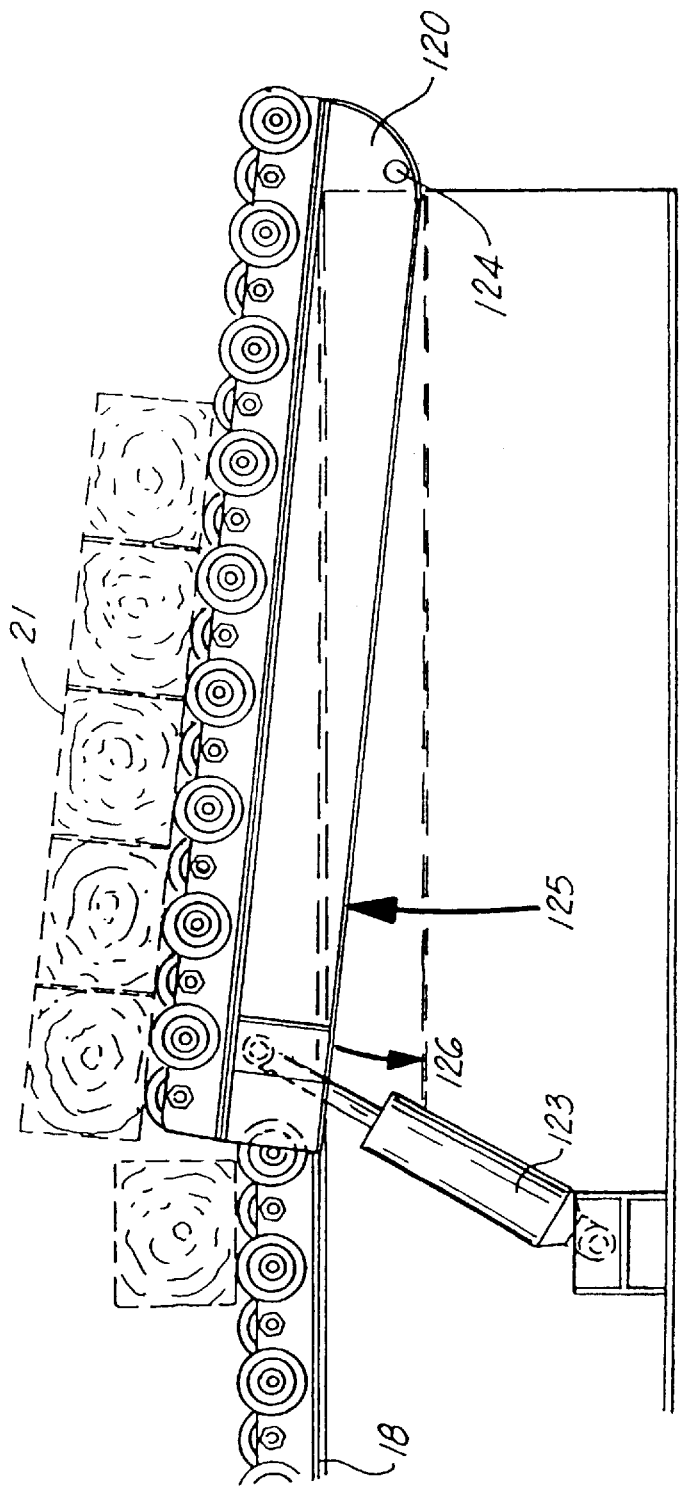

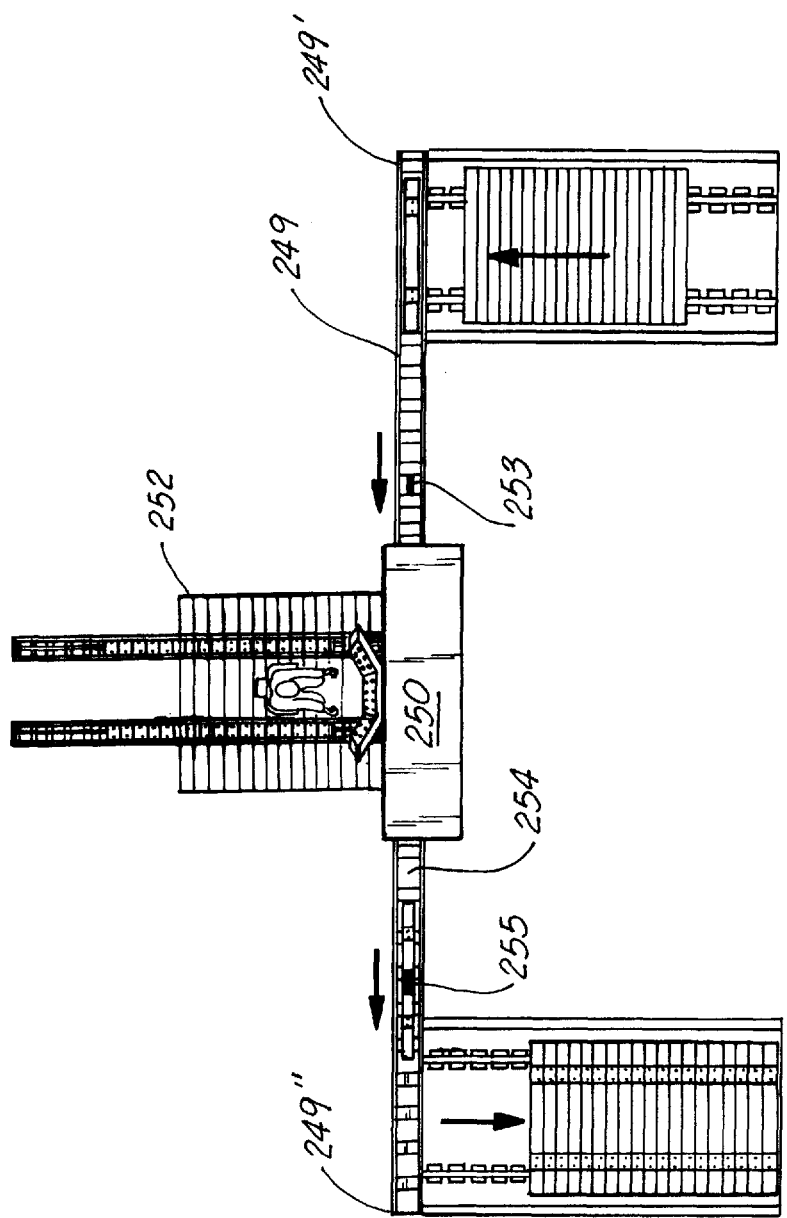

CROSS-TIE PRE-PLATING SYSTEM

STATEMENT OF PRIORITY

The present application is a continuation-in-part of Ser. No. 300,749, U.S. Pat. No. 5,528,807, issued Jun. 25, 1996, filed Sep. 6, 1994, entitled "Cross-Tie Pre-Plating System", listing as inventors Gerald D. Girouard, Sr., Gerald D. Girouard, Jr., and Donald Darcey, which patent is a continuation of Ser. No. 207,118, U.S. Pat. No. 5,343,606, issued Sep. 6, 1994, filed Feb. 28, 1994, entitled "Cross-tie Pre-Plating System", listing as inventors Gerald D. Girouard, Sr., Gerald D. Girouard, Jr., and Donald Darcey, which patent is a continuation of patent application Ser. No. 08/085,400, filed Jun. 30, 1993, now abandoned.

BACKGROUND OF THE INVENTION

1. Invention Field

The present invention relates to Railroad construction apparatus, and in particular to a machine for fastening rail plates to cross-ties, utilizing spikes or the like, pre-plating the ties for use in constructing railroad track systems or the like. The preferred apparatus of the present invention teaches a system wherein there is provided a conveyor for conveying a plurality of laterally arranged, juxtaposed ties in bulk, a loader or retriever for loading a single tie upon a template conveyer, and a positioner for positioning the single tie during the pre-plating process. The present invention further includes a template system for securing the loaded cross-tie in place, a gravity conveyor system for the rail plates, for feeding and positioning an individual rail plate in place on the tie, a spike feeding, dispensing, positioning, and driving system, and a discharging mechanism for dispensing the processed tie. The present invention is unique in its relative simplicity when compared to prior art systems, taking into account the many functions performed, with many of the principle functional elements of the invention being accomplished utilizing as a motive force the displacement of the of the upper template member, from its raised position to its lowered position.

2. General Background Discussion

While the prior art has contemplated several systems, some going as far back as the late 1800's, for fastening rail plates or the like to railroad ties, most have proved to be so complicated as to be rather expensive to construct and maintain, or so simple as to be rather labor intensive and perhaps even dangerous to utilize. Perhaps this is why (even today) for pre-plating operations, manual installation of rail plates is still the preferred method, with laborers utilizing pneumatic hammers or sledge hammers for manually affixing rail plates to railroad ties, a slow, arduous, and undoubtedly dangerous task. A listing of prior patents which may have some general interest with regard to the present case are as follows:

| U.S. Pat. No. | Inventor(s) | Dates of Issue |
| --- | --- | --- |
| 567,232 | Greenshield, W. H. | 09/08/1896 |
| 578,869 | Haley, P. | 03/16/1897 |
| 594,731 | Dowe, G. W. | 11/30/1897 |
| 680,542 | Peter, J. S. | 08/13/1901 |
| 703,755 | Bender, G. L. | 07/01/1902 |
| 712,167 | Wood, F. W. | 10/28/1902 |
| 2,762,313 | Sublett, I. | 09/11/1956 |
| 3,405,649 | Foxx et al | 10/15/1968 |
| 3,701,320 | Fearon et al | 10/31/1972 |

-continued

| U.S. Pat. No. | Inventor(s) | Dates of Issue |
| --- | --- | --- |
| 3,717,101 | Katcha et al | 02/10/1973 |
| 3,753,404 | Bryan, J. F. | 08/21/1973 |
| 4,178,671 | Lutting, D. | 12/18/1979 |
| 4,280,613 | Stewart | 07/28/1981 |
| 4,393,784 | Theurer | 07/19/1983 |
| 4,928,600 | Urmson, Jr. et al | 05/29/1990 |
| 5,067,412 | Theurer et al | 11/26/1991 |

U.S. Pat. Nos. 3,701,320 (col 1) and 4,178,671 (col 1,2) teach or suggest the utilization of rollers for conveying laterally situated cross-ties for assembly and discharge.

U.S. Pat. No. 3,753,404 teaches (FIG. 6) a type of gravity feed for spikes, although the configuration and operation is fully distinguishable from the present, searched for invention.

U.S. Pat. No. 4,280,613 issued Jul. 28, 1981, teaches a "Tie Plate Conveying and Orienting System" wherein there is taught a system for dispensing tie plates. Unlike the present invention, however, '613 does not teach or contemplate individual dispenser control and movement dependent upon the upstroke and downstroke of the spike fastening means.

U.S. Pat. No. 3,405,649 issued Oct. 15, 1968 teaches a "Spike Driver", contemplating the utilization of gravity trays for the dispensing of spikes, in conjunction with jaws for grabbing each individual spike and placing same over the area to be driven. However, '649 does teaches a jaw configuration and manipulation means more complicated and distinguishable from the present invention, both in terms of operation and implementation.

U.S. Pat. No. 703,755 issued 1902 contemplates a "Tie-Plating Machine" wherein there is taught the utilization of "gage-plates" or the like for holding the tie-plates in proper position, while being forced into the tie (the tie plates in this system utilize a distinguishable fastener built-in, as understood), the system being again distinguishable from that contemplated in the present, searched for invention.

As one may discern from a review of the above patents, the prior art has yet to contemplate an efficient, cost effective, yet safe and relatively uncomplicated system for pre-plating railroad ties or the like. Perhaps this is why manual installation is still considered, by far, the most cost effective means of accomplishing this task. However, with increasing labor and health insurance costs, as well as the inherent limitations of speed and supervision involved with a work crew, automated alternatives would be preferable, provided satisfactory alternatives existed.

SUMMARY DISCUSSION OF THE INVENTION

Unlike the prior art, the present invention provides railroad-tie pre-plating system which is comparatively low maintenance and reliable, while being relatively inexpensive to manufacture, requiring little in the way of continued adjustment, while being consistent in cycle time and output quality.

The preferred embodiment of the present invention teaches a system wherein there is included:

Gravity feed means for feeding the cross ties in bulk via decline rollers;

Retrieval means for retrieving an individual cross-tie from the gravity feed;

Positioning means for positioning a single tie under a template;

Template securing means for securing the template about the positioned tie;

Rail-plate feeding and positioning means for positioning first and second rail plates on their designated areas on the cross tie;

Magnetically actuated spike positioning means for positioning each spike in the desired areas in conjunction with the rail plates;

Hydraulic fastening means for fastening the rail plates to the cross tie via spikes;

Discharge means for removing the pre-plated cross tie for stacking.

Also, spike feeding and dispensing means for dispensing individual spikes may be provided.

Unlike the prior art, the present invention contemplates a system wherein all of the various elements interrelate in function and operation, providing a more efficient, less redundant apparatus. As such, the present invention as currently configured in a working embodiment is capable of pre-plating as many as eighty (80) + cross ties per hour cycle time, with an average cycle time of about sixty (60) per hour.

It is therefore an object of the present invention to provide a railroad cross-tie pre-plating system which can pre-plate sixty plus cross-ties in an hour, with an average cycle rate of being just under one minute per tie. This is compared to a manual crew of five workers, which typically must take breaks on the hour (more on hot days), and whose hourly rate in optimal conditions will not exceed thirty (30) pre-plated railroad cross-ties per hour.

Besides the unique method of operation, utilizing the present invention apparatus in the pre-plating context, the present invention also contemplates a novel system mechanism, wherein many of the principle functional elements of the invention are accomplished utilizing as the motive force the displacement of the reciprocating template piston from its raised position to its lowered position. This vertical motion is configured to provide the motive operating force for positioning the cross-tie to be plated, as well as dispensing the rail plates from their bulk gravity feed, individually to their appropriate position on the railroad tie for processing; this force may also be utilized for dispensing the spikes to the spike holders, for those units having the spike feeder option. A second motive force utilized comprises the spike driver pistons and their respective shaft press pieces for driving their respective two pairs of spikes, one pair of spikes for each rail plate; in addition to driving the spikes, each of these pistons operate also in conjunction with the vertical motive force provided by their respective pistons, their respective spike positioning means in the form of a template/spike manipulation arm, translating that vertical motion into back and forth horizontal motion, grabbing, handling, and positioning each rail spike in the appropriate position for fastening the rail plates to the cross-tie. An alternative embodiment of the present invention utilizes proximity switches positioned in the path of the spike driver pistons for actuating spike holder pistons, in order to engage said pike holder positions to position the spikes in conjunction with the position of the respective spike driver piston.

While the system is relatively portable, and able to be transported to a production site in three, readily assembled pieces, an alternative embodiment of the present invention teaches a version of the invention which is designed especially for portability, wherein the main conveyor/pre-plating area of the apparatus is located on a railroad flat car or tractor-trailer flatbed.

It is therefore an object of the present invention to provide a railroad cross-tie pre-plating system which is relatively simple in operation, yet efficient, reliable, and inexpensive to operate.

It is another object of the present invention to provide a railroad cross-tie pre-plating system which is able to be operated by one or two workers.

It is another object of the present invention to provide a railroad cross-tie pre-plating system wherein the many operative elements rely upon common motive force, reducing redundancy, likelihood of failure, and expense.

It is still another object of the present invention to provide a railroad cross-tie pre-plating system which provides a per unit cycle of one minute or less.

Finally, it is an object of the present invention to provide a railroad cross-tie pre-plating system which may be readily disassembled, transported to a site location, and re-assembled with minor adjustments and start-up procedure.

BRIEF DESCRIPTION OF THE DRAWINGS

For a further understanding of the nature and objects of the present invention, reference should be had to the following detailed description, taken in conjunction with the accompanying drawings, in which like parts are given like reference numerals, and wherein:

FIG. 1B is an isometric view of the cross-tie pre-plating apparatus of FIG. 1A, illustrating the last portion of the horizontal conveyor, and the gravity dump conveyor of the present invention.

FIG. 5A is a side view of the cross-tie pre-plating apparatus of the present invention of FIG. 1A, illustrating the central conveyor piece of the horizontal conveyor.

FIG. 5B is a side view of the cross-tie pre-plating apparatus of the present invention of FIG. 5A, further illustrating the central conveyor piece of the horizontal conveyor.

FIG. 15A is a side view of the cross-tie pre-plating apparatus of the present invention of FIG. 1A, illustrating the spike arm manipulation template and its interaction with the spike manipulation arm at its highest, retracted point.

FIG. 15B is a side view of the cross-tie pre-plating apparatus of the present invention of FIG. 15A, illustrating the spike arm manipulation template and its interaction with the spike manipulation arm at its medial point.

FIG. 15C is a side view of the cross-tie pre-plating apparatus of the present invention of FIG. 15A, illustrating the spike arm manipulation template and its interaction with the spike manipulation arm at its lowest, fully extended point.

FIG. 18 is an end view of the cross-tie pre-plating apparatus of the present invention of FIG. 17A, illustrating the end of the gravity dump, and tie dumping system associated therewith.

FIG. 18 is an isometric, side view of an alternative, updated model of the original invention of FIG. 1, illustrating an alternative layout, wherein the loading/unloading conveyors are mounted to the side of the machine opposite the operator.

FIG. 18A is a top view of the updated model of FIG. 18, illustrating the path of an exemplary timber during plating operations.

DETAILED DESCRIPTION OF THE INVENTION

Figure 1A:
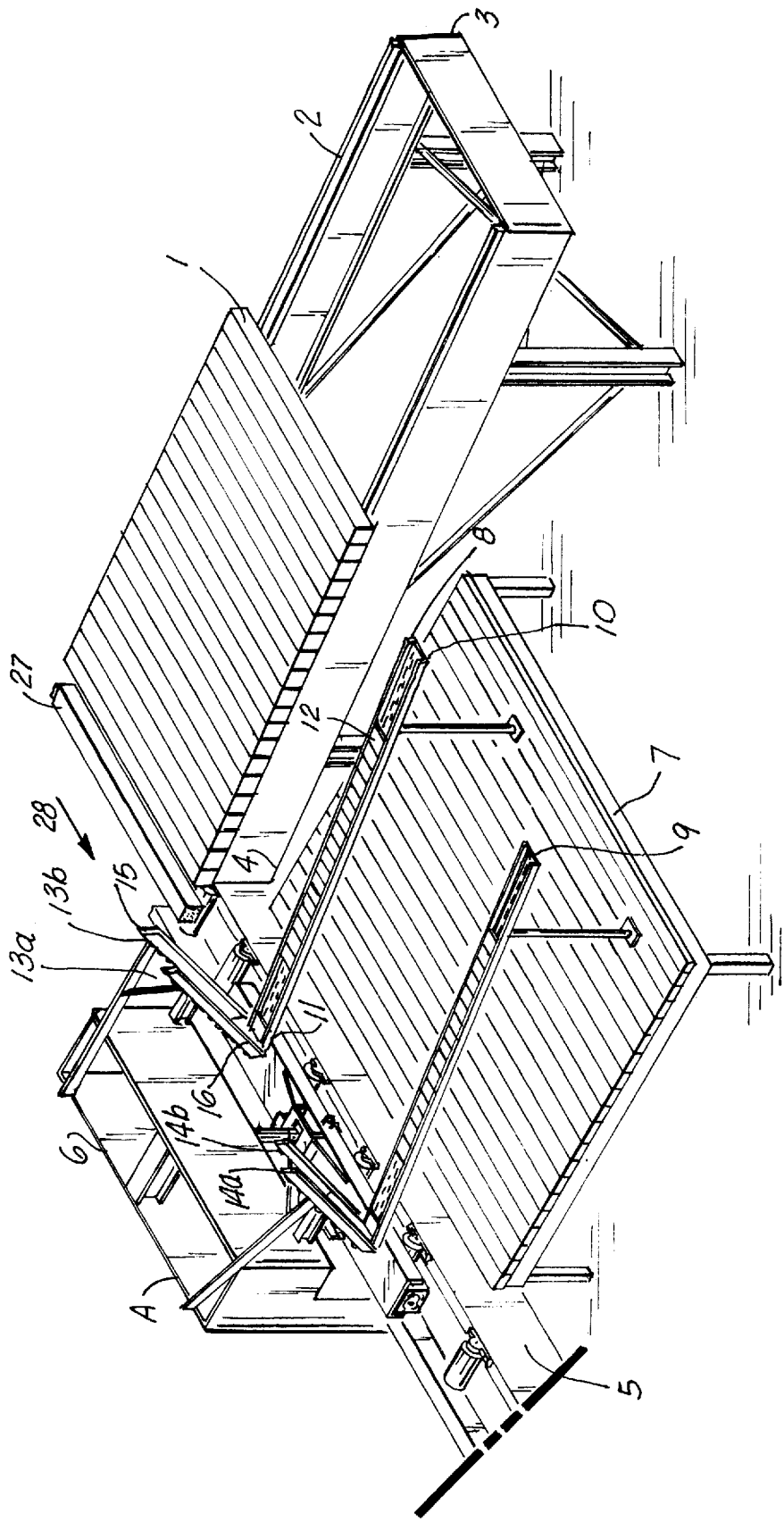
FIG. 1A is an isometric view of the cross-tie pre-plating apparatus of the present invention, illustrating the cross-tie gravity conveyor, horizontal conveyor, and pre-plating section of the apparatus of the present invention.

As can be seen in FIG. 1A, the railroad cross-tie pre-plating system A of the preferred, exemplary embodiment of the present invention, includes a gravity conveyor 2 having bulk, un-plated railroad ties 1 juxtaposed in lateral disposition thereon, the gravity conveyor having a first, higher end 3, and a second, lower end 4. As shown, the gravity conveyor 2 communicates with a horizontal conveyor 5, configured to accept one tie at a time, the horizontal conveyor configured to guide a loaded tie 27, directing 28 said tie into and out of the plating area 6.

As shown, juxtaposed the gravity feed 2 and horizontal conveyor 5 is an operation platform 7, wherein the operator monitors and operates the present system. Disposed longitudinally along the platform are first 8 and second 9 plate conveyors, for conveying (via gravity) railroad plates 12 to the pre-plating area, each plate conveyor 8,9 having a first, higher end 10 and a second, lower end 11.

Additionally, the present invention includes first 13a,b and second 14a,b pairs of spike gravity conveyors for conveying spikes into the plating area 6, each one of the spike gravity conveyors 13a,b, 14a,b having a first, upper end 15, and a second, lower end 16, the second lower end communicating with the plating area 6.

As illustrated in FIG. 1B, the apparatus of the present invention further includes a gravity dump conveyor 18, having a first, upper end 19, and a second, lower end 20, the gravity dump conveyor in communication with the end of the horizontal conveyor 5. As further shown, a kicker 17 mechanism is configured remove the processed be from the horizontal conveyor 5, placing the processed railroad ties 21 upon the gravity dump conveyor 18.

Figure 2A:
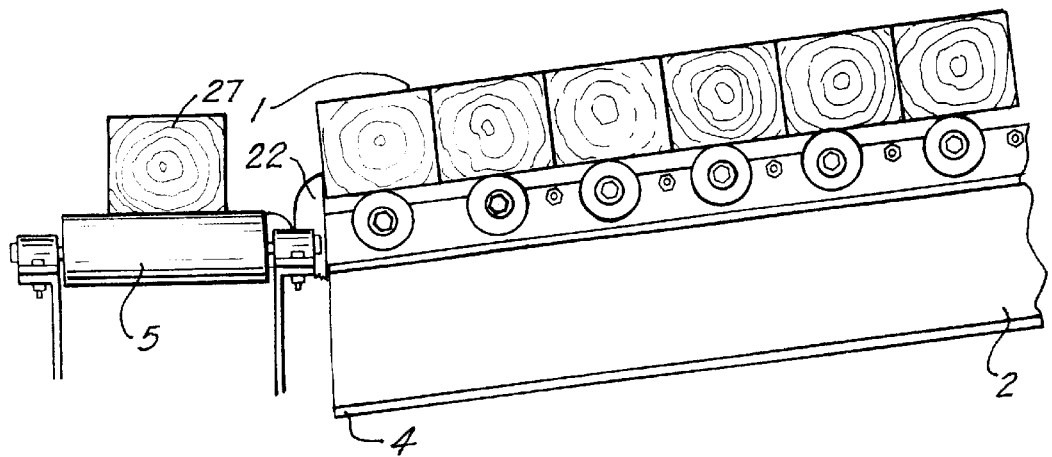
FIG. 2A is a side view of the cross-tie pre-plating apparatus of the present invention of FIG. 1A, illustrating the blocking member apparatus for dispensing individual ties from the gravity conveyor to the horizontal conveyor.
Figure 2B:
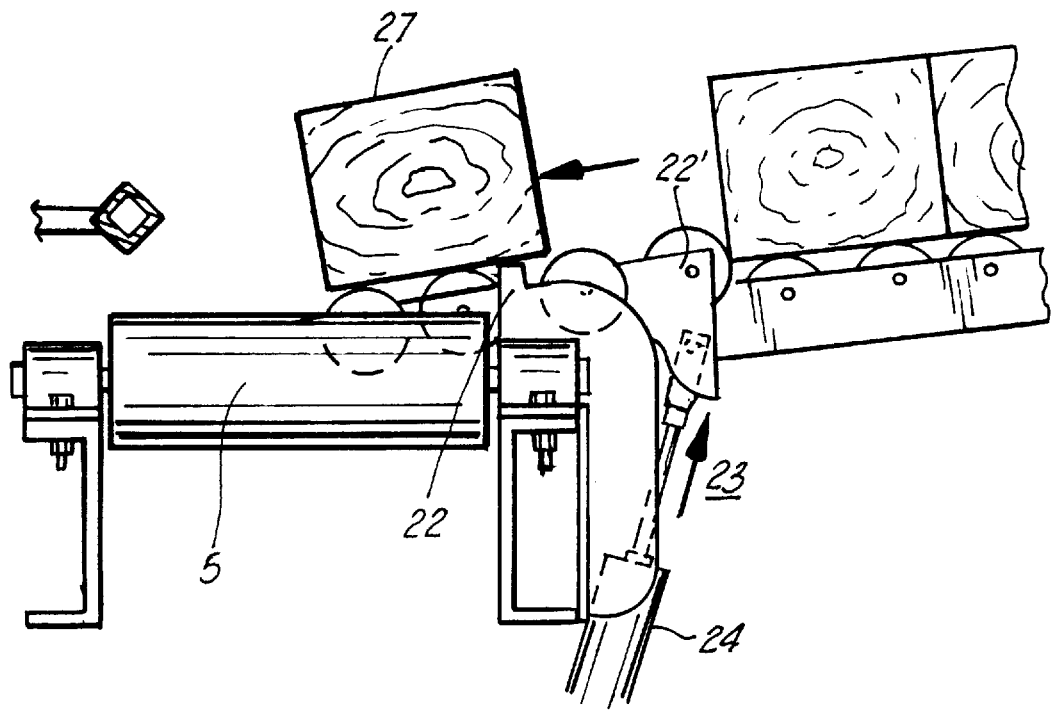
FIG. 2B is a side view of the cross-tie pre-plating apparatus of the present invention of FIG. 2A, illustrating the blocking member apparatus and lifting mechanism for dispensing individual ties from the gravity conveyor to the horizontal conveyor, and operation of same.
Figure 2C:
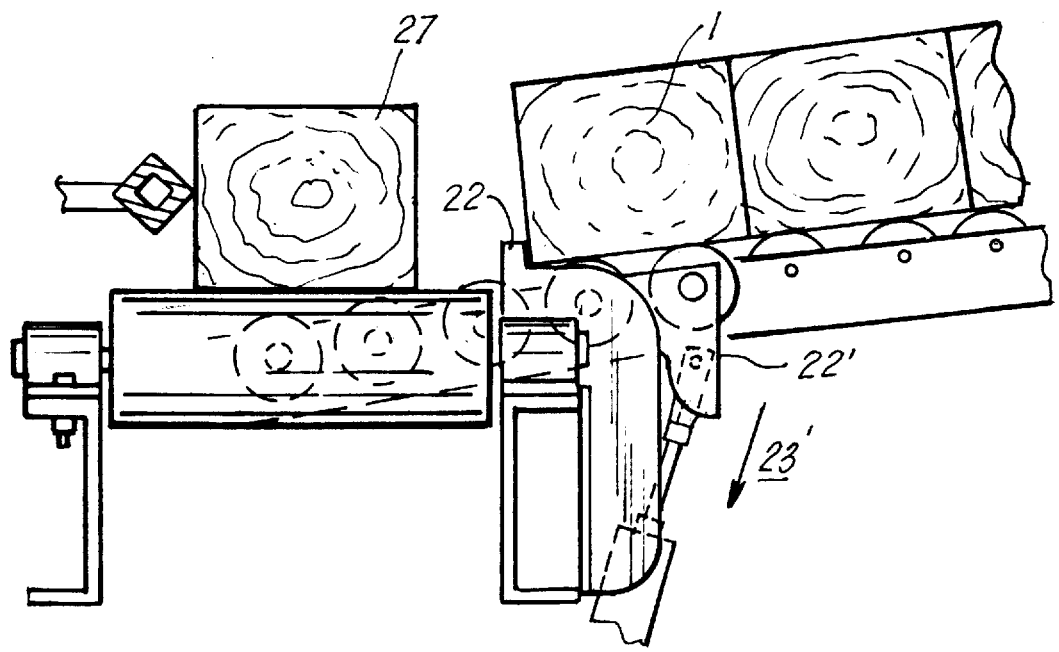
FIG. 2C is a side view of the cross-tie pre-plating apparatus of the present invention of FIG. 2A, illustrating the loaded tie on the horizontal conveyor.

As shown in FIG. 2A, the railroad ties 1 are dispensed individually to the horizontal conveyor 5 via the second, lower end 4 of the gravity conveyor, which utilizes a blocking member 22, configured to hold back the bulk of railroad ties I and allow for the dispensing of a single loaded tie 27 upon demand. Referring to FIGS. 2B, when a tie is desired to be loaded upon the horizontal conveyor for processing, as shown, a reciprocating piston 24 is actuated, lifting 23 a loading bar or "kicker" 22' at an angle, thereby lifting a single railroad tie 1 over the blocking member 22, and allowing the free tie 1 to roll over rollers on the loading bar, onto the horizontal conveyor 5, providing a dispensed tie 27 upon the horizontal conveyor 5. Once the tie is loaded, the loading bar 22' is lowered 23', allowing the next tie 1' to roll over rollers to blocking member 22, as shown in FIG. 2C. A proximity switch and/or timer circuit may be utilized to facilitate the lowering of the loading bar, as the tie is loaded.

Figure 3A:
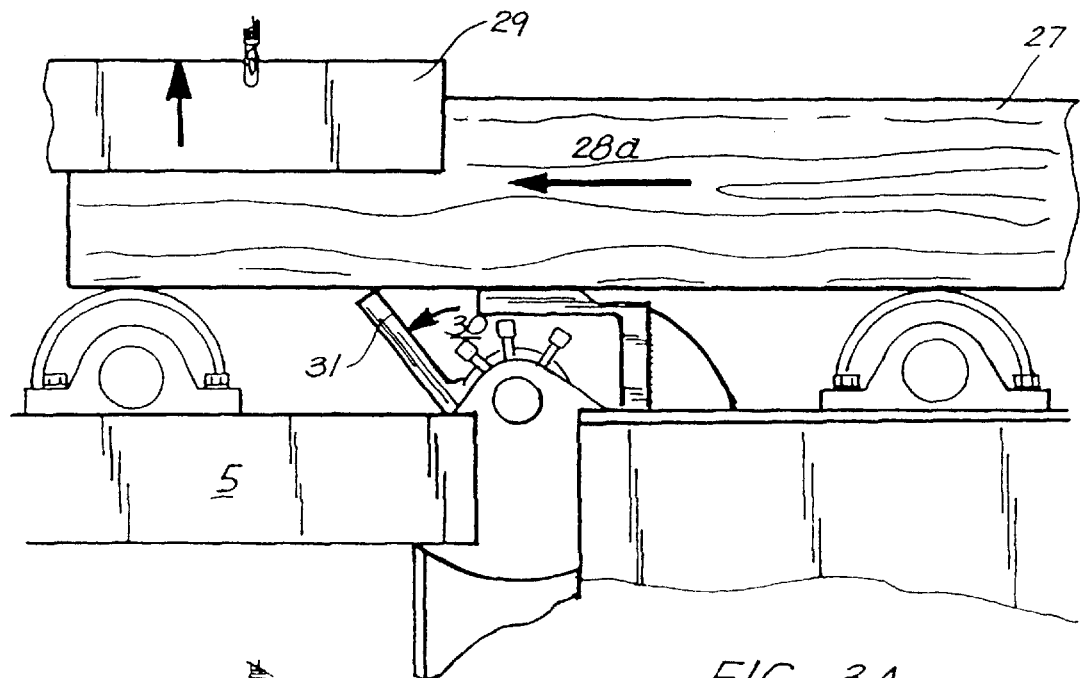
FIG. 3A is a side view of the cross-tie pre-plating apparatus of the present invention of FIG. 1A, illustrating the blocking member of the horizontal conveyor.
Figure 3B:
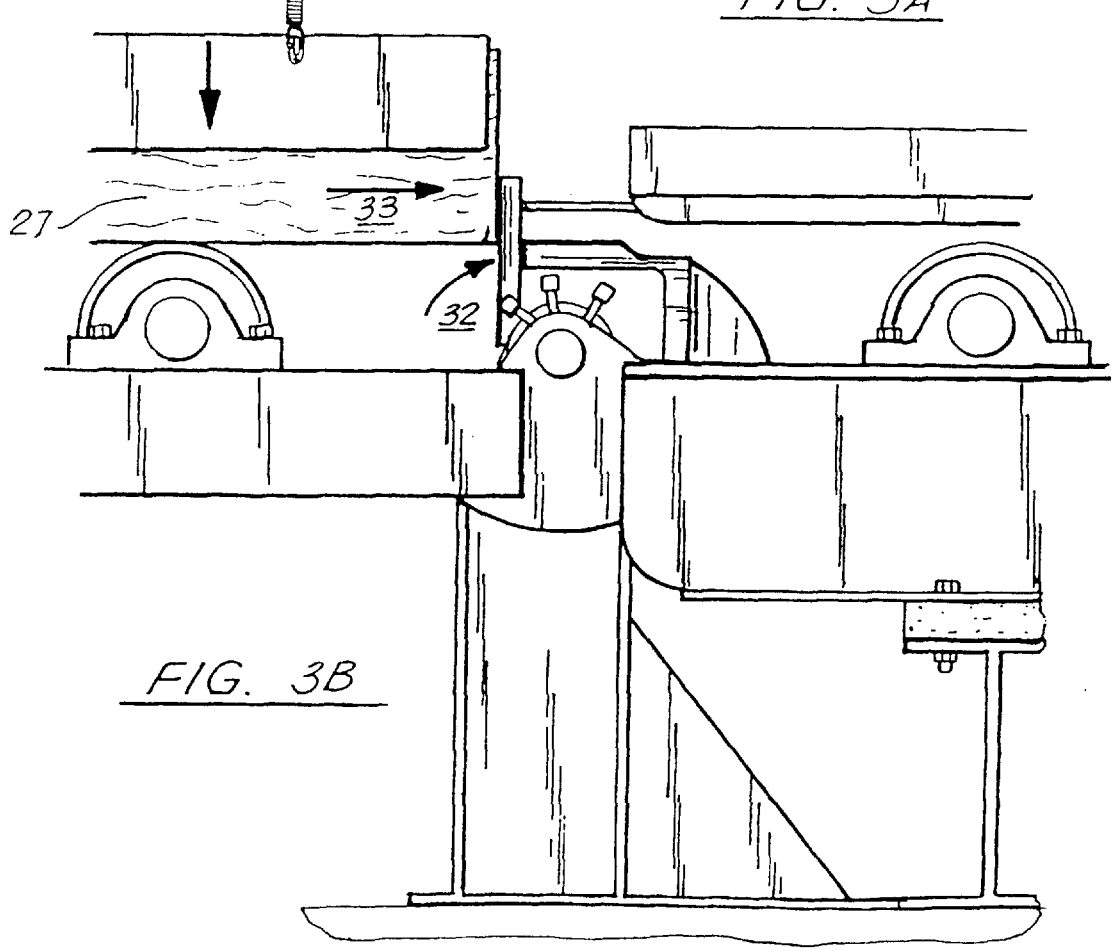
FIG. 3B is a side view of the cross-tie pre-plating apparatus of the present invention of FIG. 3A, further illustrating the blocking member of the horizontal conveyor.

Referring now to FIGS. 3A and 3B, once the tie 27 is loaded onto the horizontal conveyor 5, it is directed 28a via the conveyor rollers under the upper template 29 of the plating area, the tie directing 30 a blocking member 31 to rotate about a pivot point. The blocking member is weighted to return to its blocking position 32 once the tie has cleared the blocking member. After the tie has cleared the blocking member, the conveyor is reversed by the operator, directing the tie back 33 towards the blocking member 31 until the tie intersects with same, thereby positioning the tie in the appropriate longitudinal position with the plating apparatus.

Figure 3C:
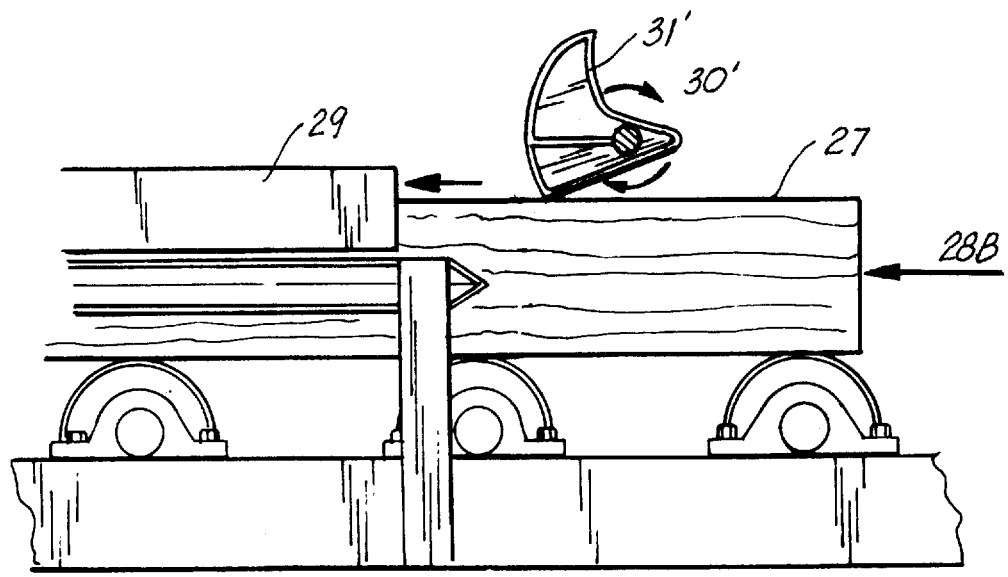
FIG. 3C is a side view of the cross-tie pre-plating apparatus of the present invention of FIG. 1A, illustrating a stabilizer situated on the horizontal conveyor, following the loading area but before the plating area, for stabilizing and situating a cross-tie for plating in the plating area.
Figure 3D:
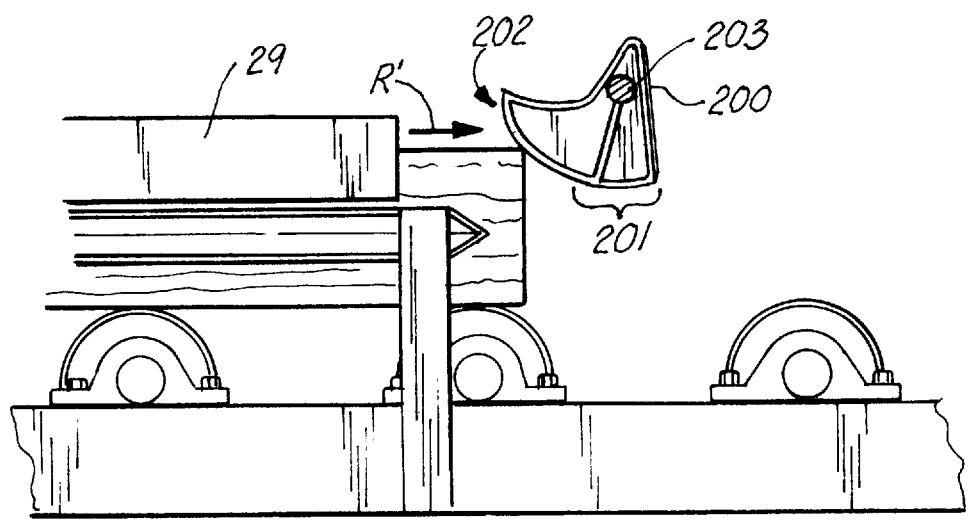
FIG. 3D is a side view of the cross-tie pre-plating apparatus of the stabilizer of FIG. 3C, illustrating the cross tie having been reversed on the conveyor, interfacing with the stabilizer, and allowing the stabilizer to engage the cross-tie, urging same against the conveyor, preventing further movement along the conveyor, for stabilizing and situating a cross-tie for plating in the plating area.

FIGS. 3C and 3D illustrate an alternative means of stabilizing the crosstie in the appropriate position for plating, wherein the cross-tie 27 is directed towards towards 28B the upper template 29 of the plating area, wherein the tie interfaces with a stabilizer 31'. The stabilizer is situated to pivot 30' about a horizontal axis 203 lateral to the longitudinal axis of the conveyor, the stabilizer further include a relatively blunt or flat side wall 200 directed on the one side of the stabilizer opposite the template 29, and is weighted such that, when pivoted via contact with a cross tie, the base is urged downward, as shown further in FIG. 3D. The stabilizer further includes a radial base area 201 providing a curved periphery which would extend from the base area forming extending upward along the opposing side 202 of the stabilizer, extending up to generally about the level of the axis 203.

En route from the loading area to the plating area, just prior to interfacing with the template, the front end of cross-tie 27 engages the stabilizer 31', causing same to pivot 30' about the axis, allowing the cross tie to pass thereunder. Once the cross-tie 27 has passed fully under the stabilizer, the horizontal conveyor is then reversed, causing the cross-tie then engages the radial side 202 of the stabilizer, which cannot rotate in an opposing direction as the curved configuration, coupled with the reverse direction R', causes the end of the cross-tie engaging the stabilizer to become wedged under same, due to downward pressure caused by the attempted rotation of the stabilizer in the reverse direction, which in effect pins the end of the cross-tie downwards against the conveyor, effectively positioning the cross-tie in longitudinal position under the template 29, as the stabilizer is placed precisely at a location along the conveyor for the express purpose of longitudinally aligning the cross-tie to be plated with the template 29.

Figure 3E:
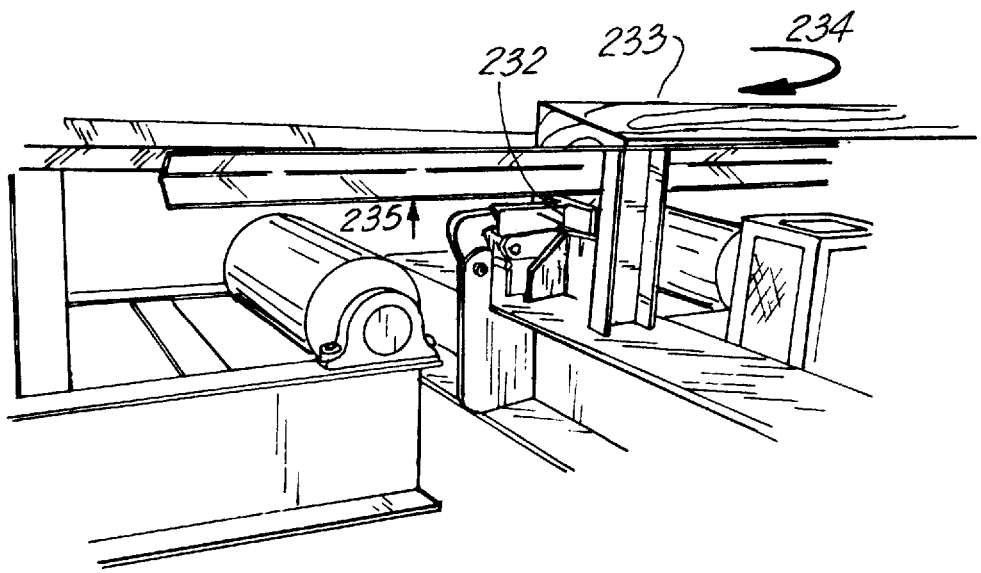
FIG. 3E is a side view of the cross-tie pre-plating apparatus of the present invention of FIG. 1A, illustrating a stop mechanism situated on the horizontal conveyor, following the plating area but before the unloading area, for preventing further movement of the un-plated cross-tie past the plating area.
Figure 3F:
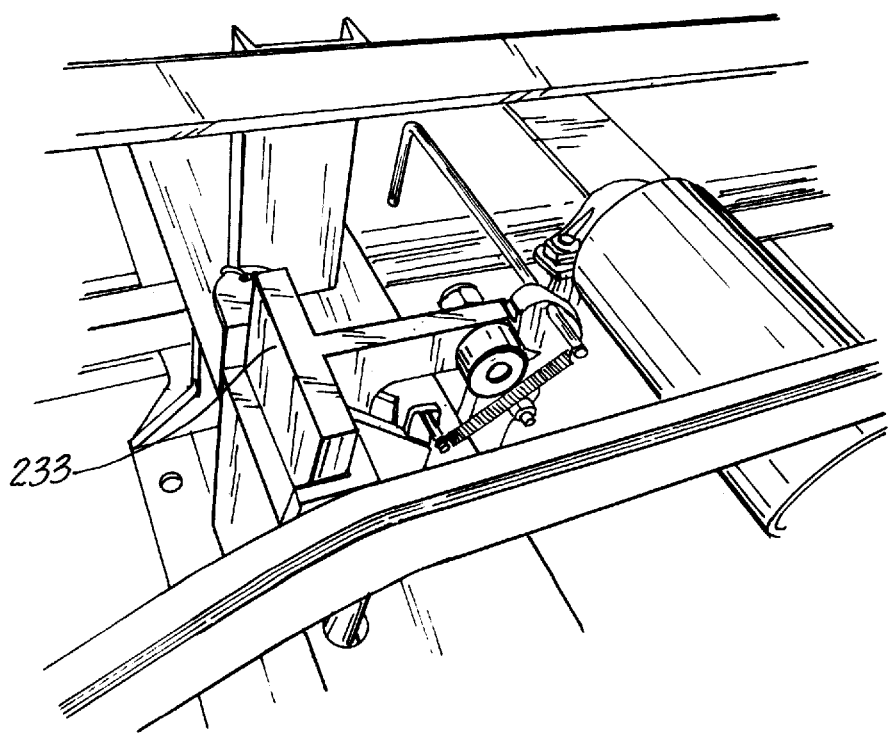
FIG. 3F is an isometric view of the stop mechanism of FIG. 3E, illustrating a close-up view of the stop mechanism and associated re-setting mechanism.

For preventing the un-plated cross-tie from passing through the plating area and on the unloading area at the end of the conveyor, a selective stop member may be provided, as shown in FIGS. 3E–3F. Referring to FIG. 3E, the stop 232, which is situated after the plating area on the conveyor, but prior to the unloading area, is configured to raise 235 to engage an un-plated cross-tie 233 stopping 234 same from further traversing the conveyor during the positioning process, allowing the operator to reverse the conveyor, such that the cross-tie engages the stabilizer, above.

Figure 14:
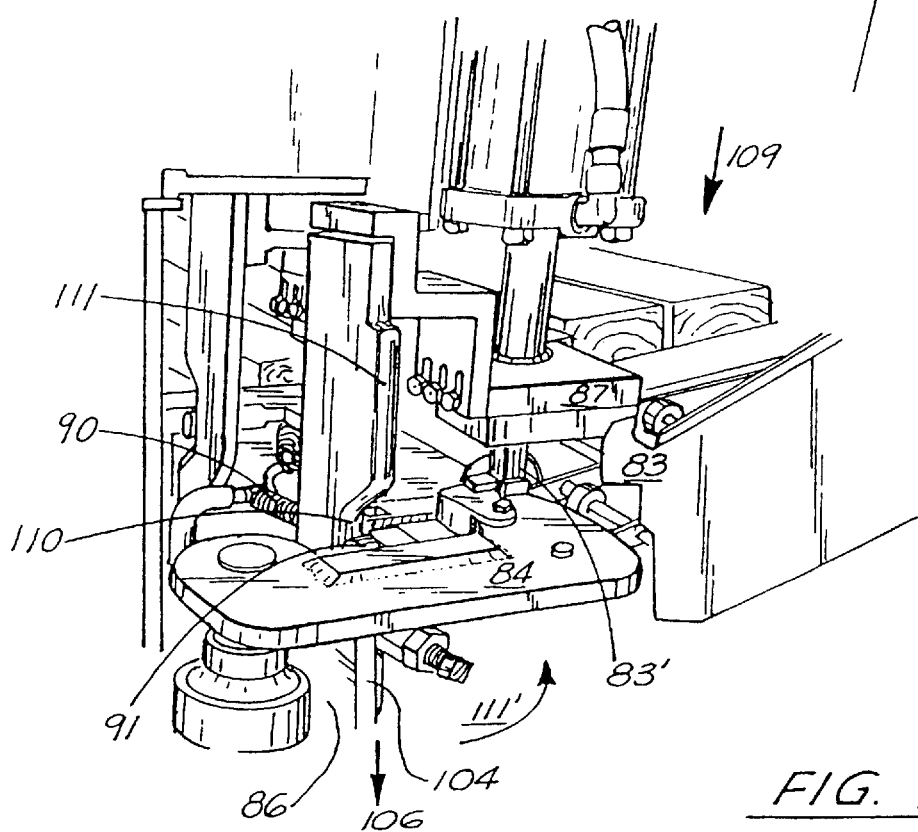
FIG. 14 is an isometric view of the cross-tie pre-plating apparatus of the present invention of FIG. 1A, illustrating the placement of the spike in the appropriate driving position via the spike manipulation arm.
Figure 14A:
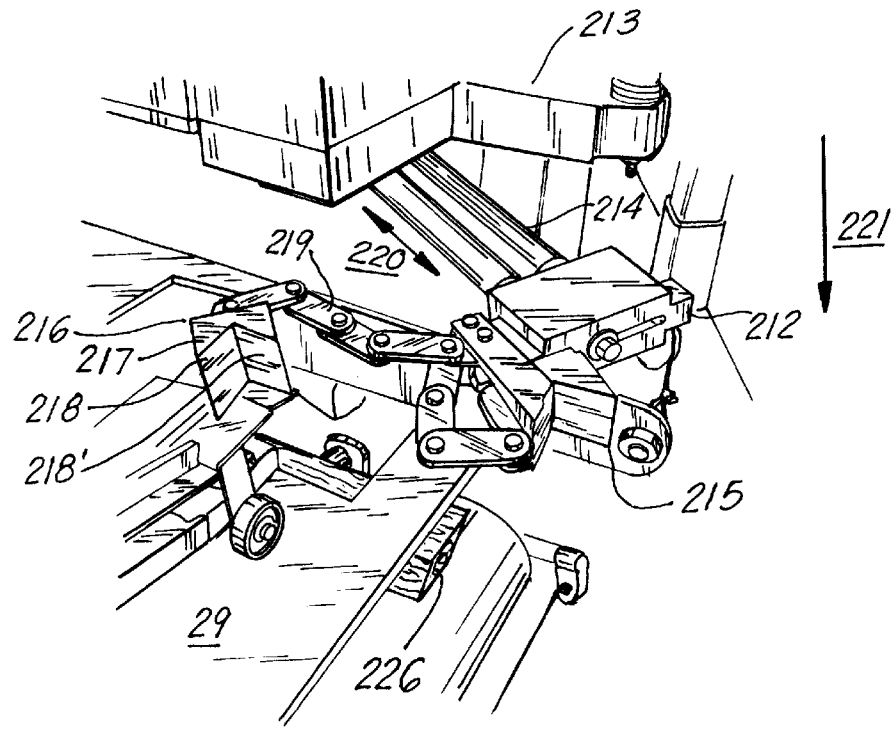
FIG. 14A is an isometric view of the invention of FIG. 1A, illustrating an alternative, manually loaded, spike positioning system.
Figure 14B:
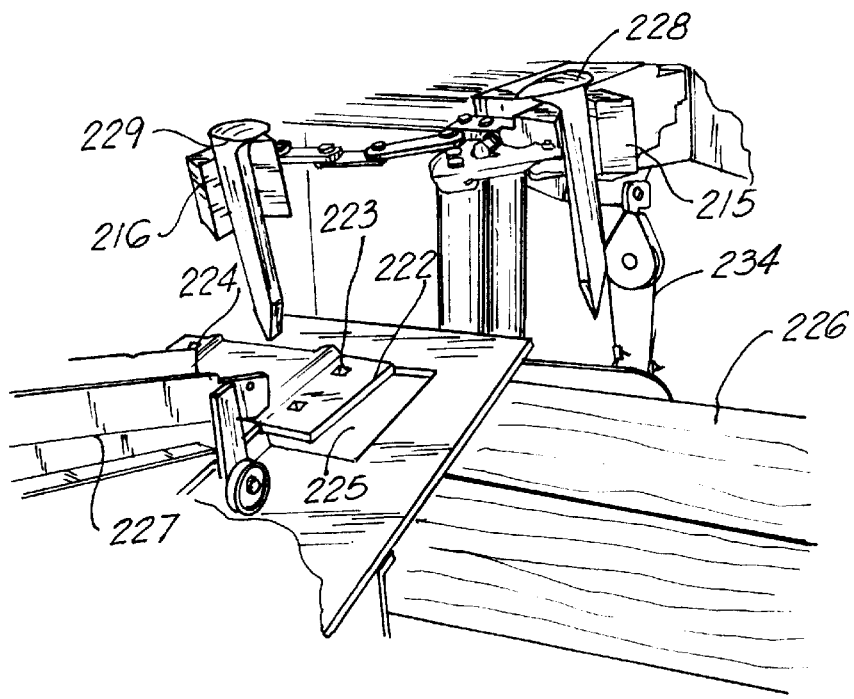
FIG. 14B is an isometric view of the invention of FIG. 14A, illustrating manually loaded spike positioning system with spikes magnetically situated thereon.
Figure 14C:
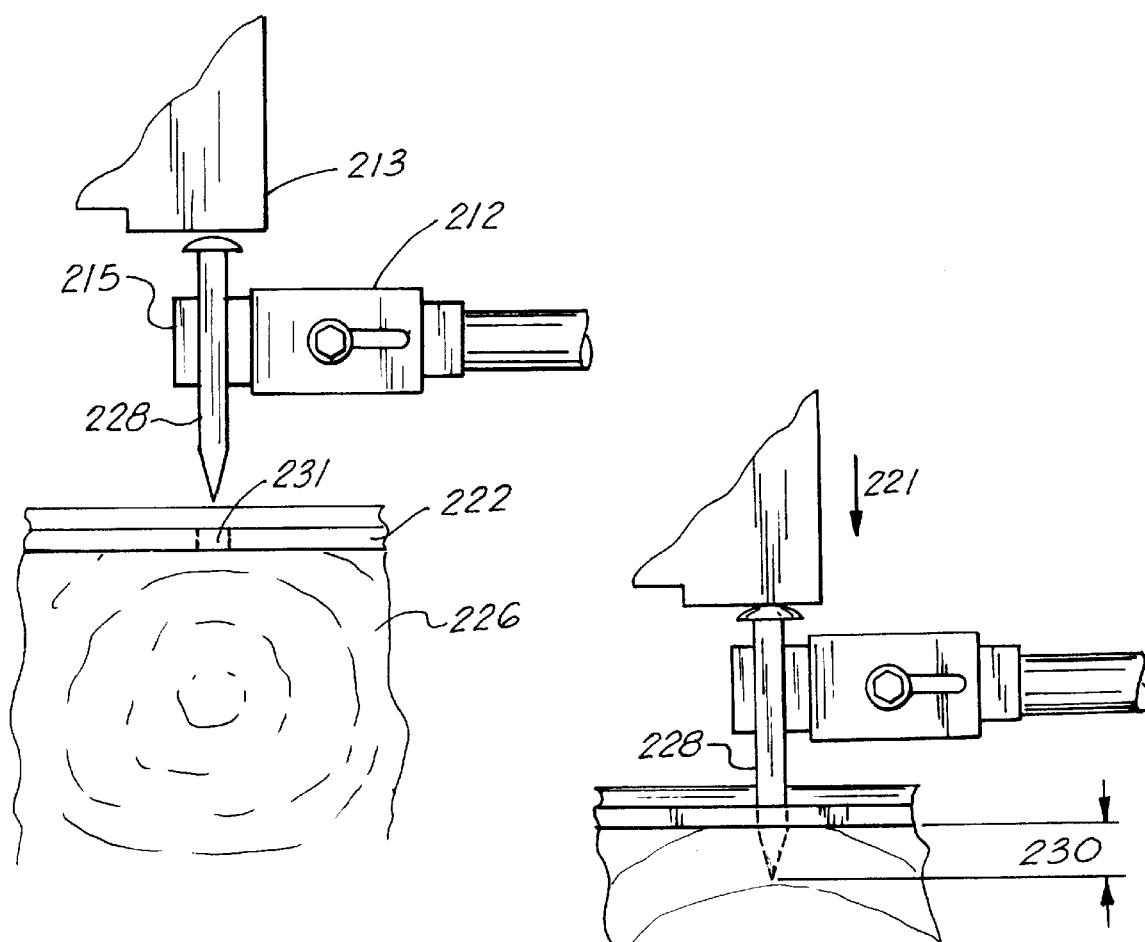
FIGS. 14C, 14D, and 14E illustrate an end, partially cross-sectional view of an exemplary spike (shown partially in phantom) being driven into a cross-tie.
Figure 14D:
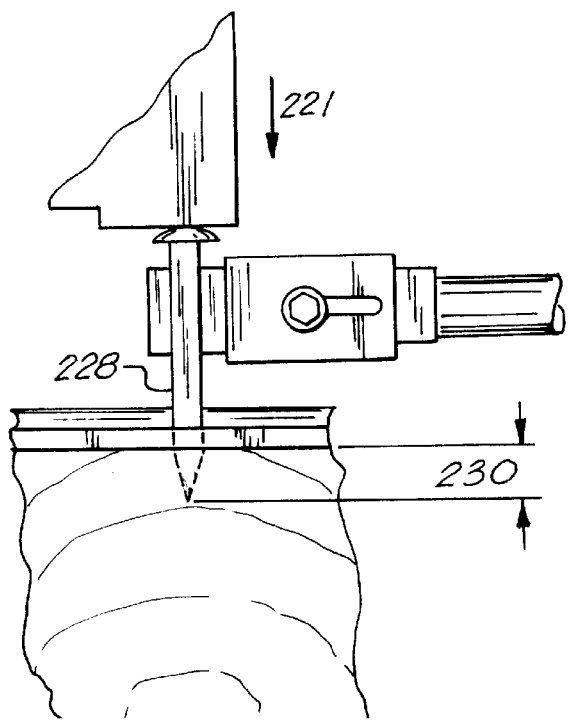

The stop may be manually raised or lowered, or may be linked, for example, to the lowering or raising of the upper template, via cable or the like (as shown in element 234, FIG. 14B, for example). For example the mechanism could be set up utilizing ordinary skill such that raising of the template, via cable 234, causes the stop member to lower, allowing for an unhindered path of the plated cross-tie via the conveyor to the unloading area.

FIG. 3F illustrates a close up view of an exemplary embodiment of the stop member, comprising a reinforced vertical stop member, shown in the raised position, along with the position setting mechanism, which will be more fully discussed below.

Figure 3G:
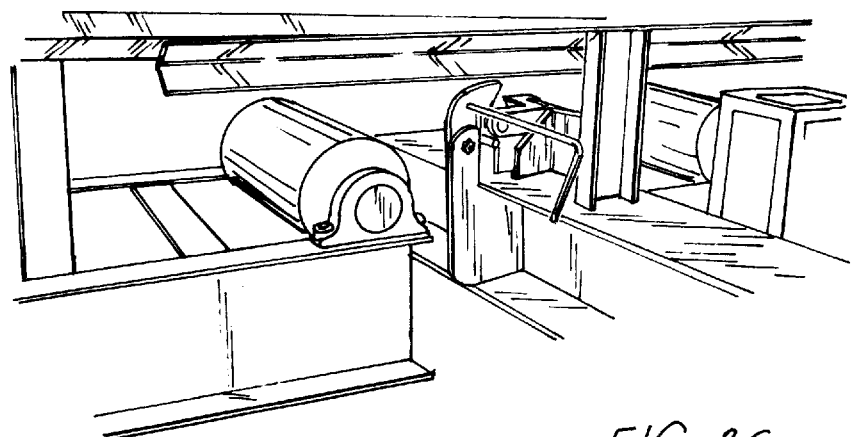
FIG. 3G is a side view of the stop mechanism of FIG. 3E, illustrating a close-up view of the stop mechanism and associated re-setting mechanism.
Figure 3H:
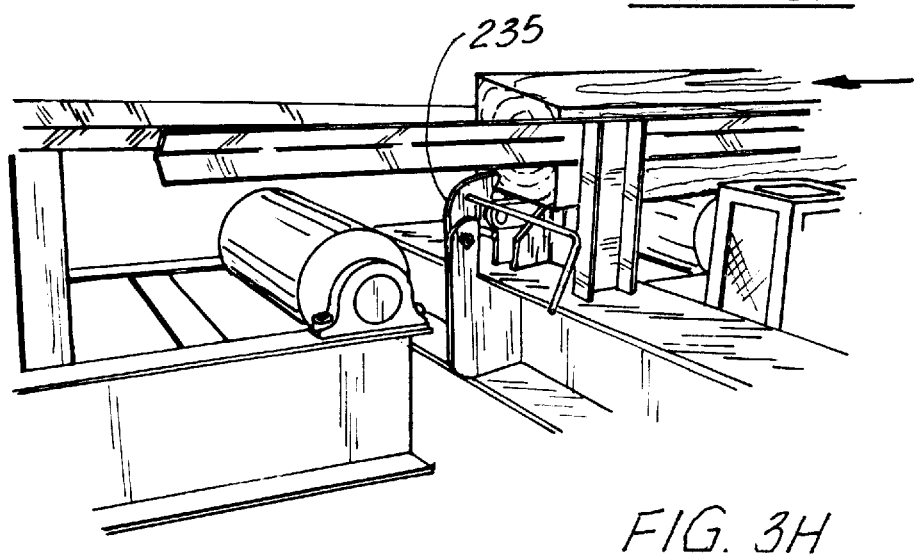
FIG. 3H is a side view of the stop mechanism of FIG. 3E, illustrating a cross-tie along the horizontal conveyor about to cross over the stop mechanism in its lowered position, and the end of the cross-tie about to interface with the re-setting lever, to allow for the raising of the stop member once the tie passes thereover.
Figure 3I:
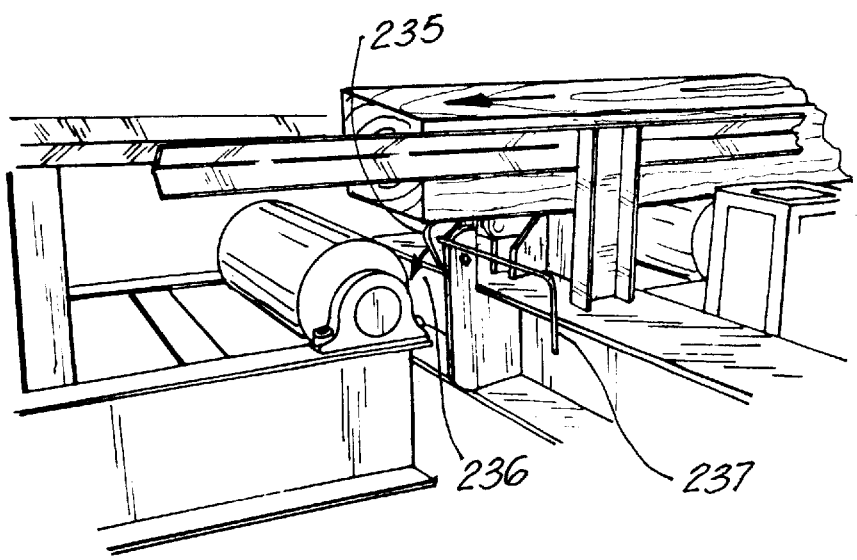
FIG. 3I is a side view of the stop mechanism of FIG. 3E, illustrating a cross-tie along the horizontal conveyor crossing over the stop mechanism in its lowered position, and the end of the cross-tie about interfacing with the re-setting lever, raising of the stop member once the tie passes thereover.

FIGS. 3G–3I illustrate an exemplary re-setting of the stop mechanism. As discussed above, once the template is raised or lowered, the stop may be configured to mechanically lower as well, via control cable, actuator/proximity switch, or sensor or the like, resulting in the stop being set into a lowered position, as shown in FIG. 3G. The plated cross-tie may then pass over the stop, as shown in FIG. 3H, wherein the end of the tie engages a hook member 235, which pivots 236 (FIG. 3I), which resets the stop, such that it pops back up via spring or the like once the tie has fully passed thereover. Handle 237 may be affixed to hook member 235 to manually reset the system, raising the stop as desired. This stop mechanism is not an essential element of the present invention, but it does assist the operator in positioning the un-plated cross-tie in the plating area.

Figure 4A:
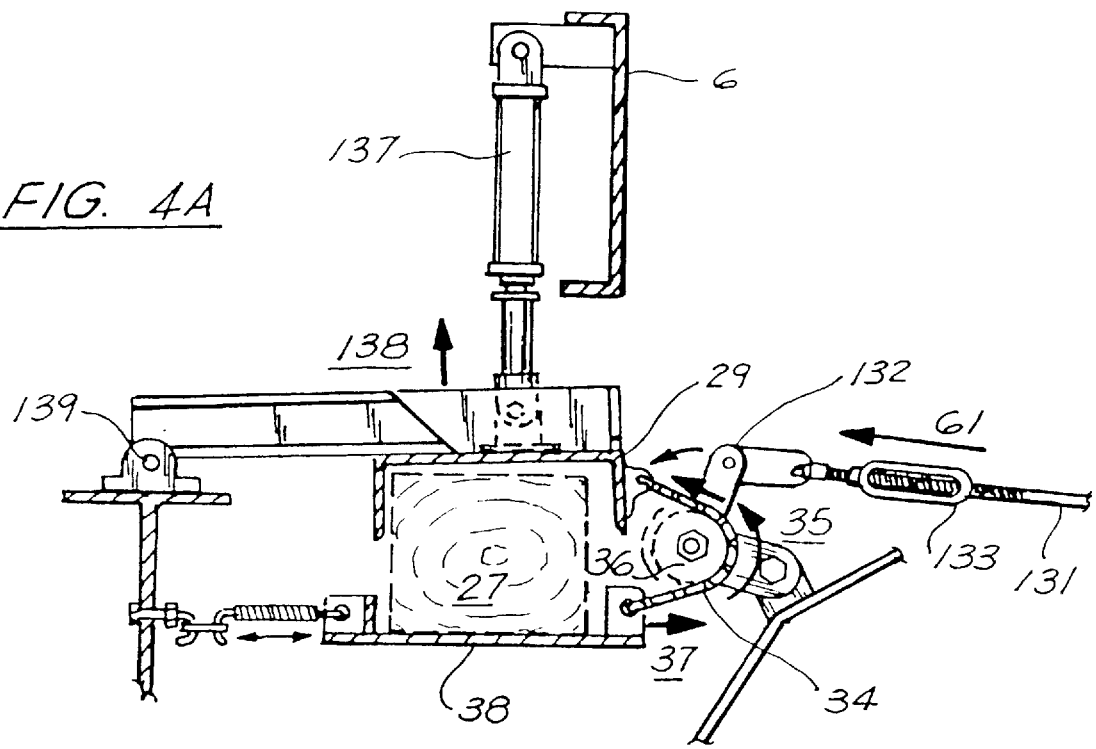
FIG. 4A is an end view of the cross-tie pre-plating apparatus of the present invention of FIG. 1A, illustrating the operation of the plating area and template.
Figure 4B:
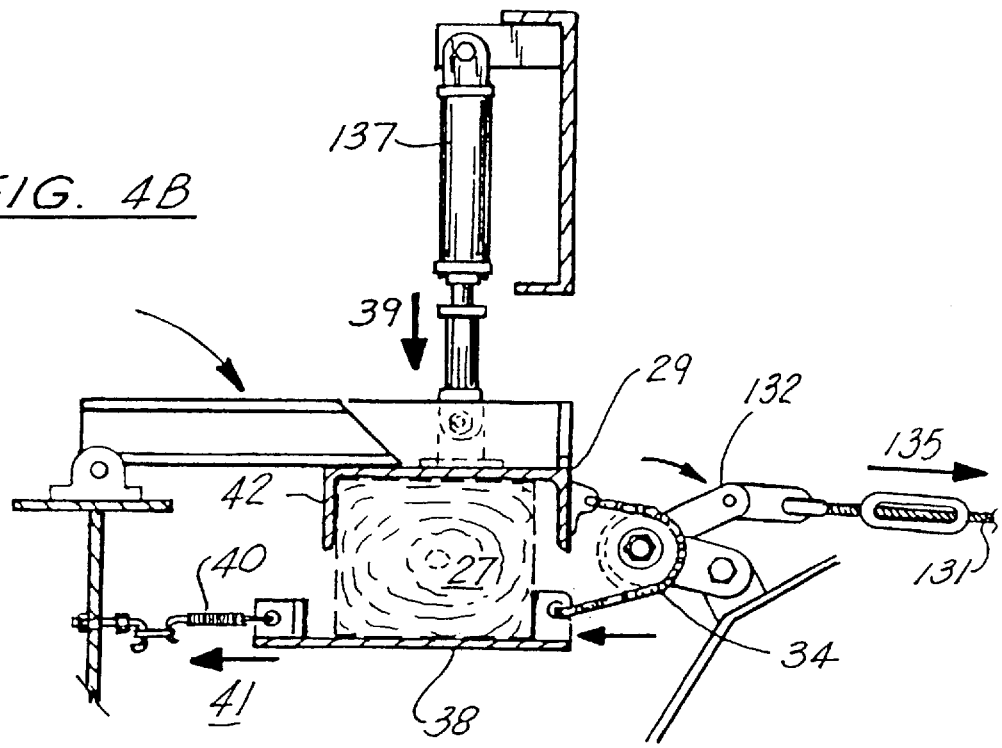
FIG. 4B is an end view of the cross-tie pre-plating apparatus of the present invention of FIG. 4A, further illustrating the operation of the plating area and template.

Moving on with FIGS. 4A and 4B, the plating area 6 of the present invention includes an upper template 29 and a lower template 38 configured to accept the loaded tie 27. The template is configured to provide multiple functions, including positioning the tie laterally and plate thereon. In order to provide consistent tie placement on the ties, each tie must be positioned under the template in a consistent and accurate fashion. Positioning the tie in longitudinal fashion is disclosed in the above paragraph. With regard to positioning the tie laterally, the lower template 38 is configured to migrate 37, 41 in lateral fashion relative the horizontal conveyor in response to the up and down movement of the upper template 29.

Further referring to the drawings, reciprocating piston 137, directed by the operator, is retracted, lifting 138 the upper template 29 which is pivotally connected 139 at the back end, allowing clearance for the placement therein of the tie 27. Before placement of the tie, however, the operator must then further lift 138 the upper template 29 via further retracting of the piston 137, causing lateral movement 37 of the lower template 38 towards the platform, the lower template's 38 movement due to its connection with upper template via chain 34, which is in turn directed through sprocket 36. When the template is lifted, this causes counterclockwise rotation 35 of the sprocket 34, which in turn pulls 37 the lower template toward the platform, aligning the upper and lower templates for insertion of the tie 27 therein via the horizontal conveyor.

Upon insertion of the tie 27 via the horizontal conveyor by the operator, the reciprocating piston 137 is then directed by the operator to extend, lowering 39 the upper template 29, causing clockwise rotation of the sprocket via the chain 34, allowing spring 40 to pull 41 the lower template 38 and tie 27 back away from the platform to the appropriate lateral position for installation of the tie, the blocking member 42 holding the tie 27 at the appropriate position, in conjunction with spring bias via spring 40.

As shown in FIGS. 5A and 5B, the central conveyor 5 of the present invention includes a support spring 127 supported section immediately below the template area. Referring to FIG. 5A, the spring supported section is configured such that when downward force 129 is exerted upon upper template 29 via piston 137, said force is translated 130 to lower the lower template and central conveyor area support 43 via tie 27. In order to provide support for the spiking operation, and prevent damage to the rollers, the central conveyor area is configured to be displaced downward 130 such that the central conveyor area support 43 is resting upon base support 128. After the spiking operation, the piston 137 retracts, allowing the support spring 127 to raise the central conveyor area support to the level of the rest of the conveyor, allowing the tie to be removed via same.

Figure 6:
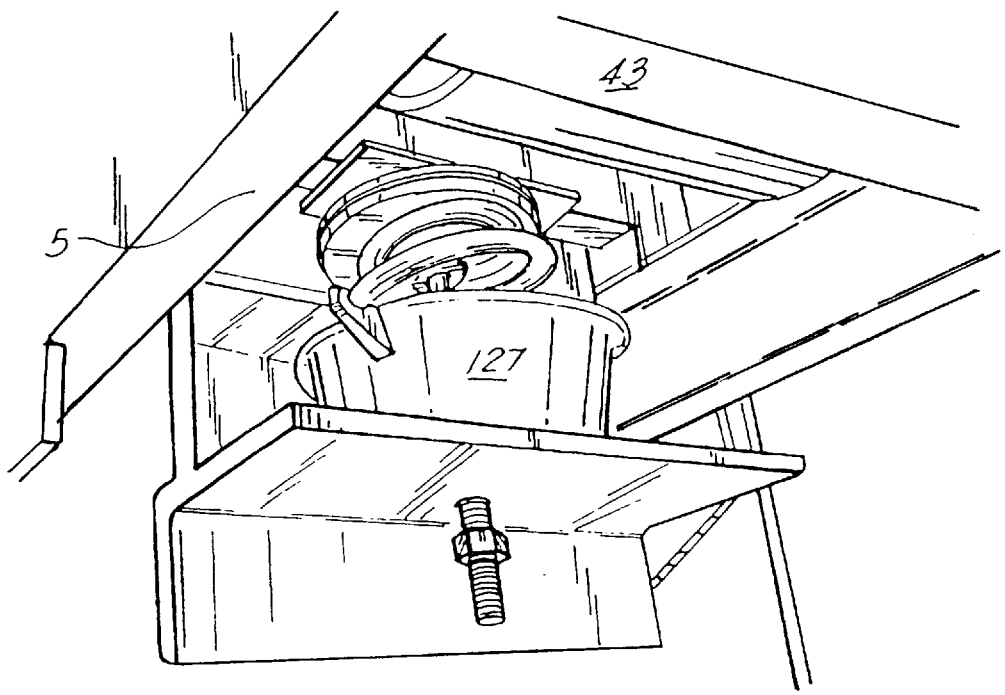
FIG. 6 is a side view of the cross-tie pre-plating apparatus of the present invention of FIG. 1A, illustrating the support spring of the central conveyor piece.

FIG. 6 illustrates a close-up view of the support spring 127, which is affixed to base 128, the upper portion communicating with the central conveyor area support 43 of the horizontal conveyor 5. The support spring may be replaced with other shock absorption means, or shock absorption means, including the floating conveyor area support, may be dispensed with entirely, being replaced with a rigid central conveyor area.

Figure 7:
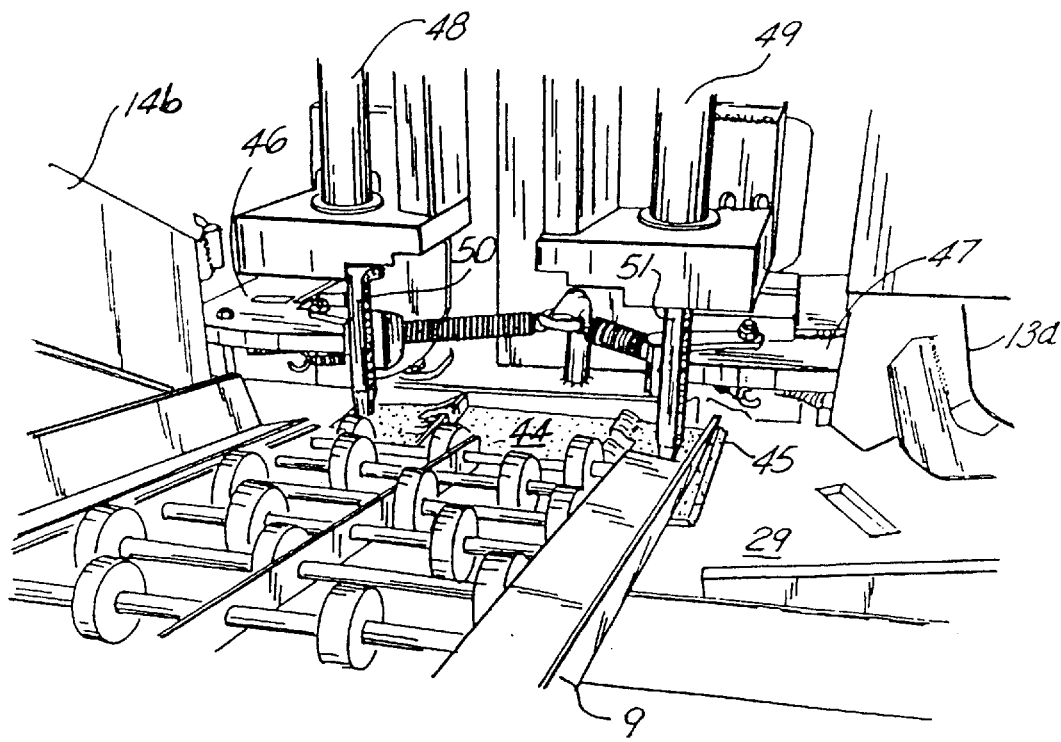
FIG. 7 is a frontal, isometric view of the cross-tie pre-plating apparatus of the present invention of FIG. 1A, illustrating the rail plate conveyor piece communication with the pre-plating area.

FIG. 7 illustrates the lower end of the second gravity plate conveyor, and its juxtaposition to the lowered template 29, such that a released rail plate 44 from the conveyor 9 falls in the vicinity of the template plate cut 45. Further shown is the position of the second, lower end of the inner spike gravity conveyors 13*a*, 14*b*, each configured such that their dispensed spikes 50, 51 are within reach of their respective spike manipulation arms 46, 47, for fastening the template 44 to the tie via pistons 48, 49, respectively.

Figure 8A:
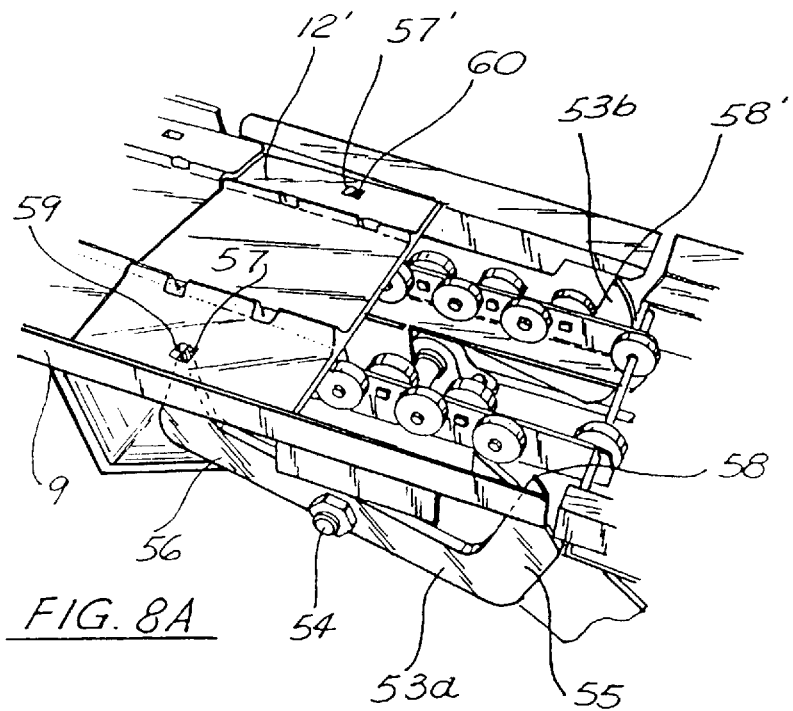
FIG. 8A is an isometric view of the cross-tie pre-plating apparatus of the present invention of FIG. 1A, illustrating the plate conveyor and pivotal loading member.
Figure 8B:
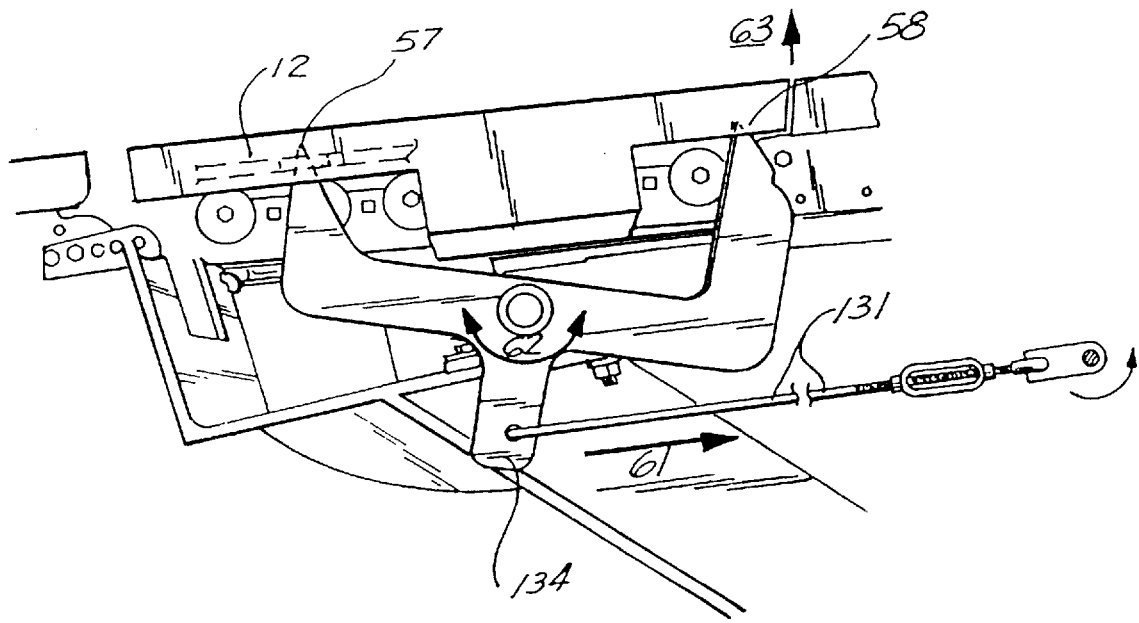
FIG. 8B is a side view of the cross-tie pre-plating apparatus of the present invention of FIG. 8A, illustrating the operation of the pivotal loading member, dispensing a plate.

FIGS. 8A and 8B illustrate the means by which individual rail plates are dispensed from the gravity conveyor 9 from the bulk of loaded plates. As shown, the rail plates 12 are loaded upon the conveyor one after another in single tier fashion, from the first, higher end of the conveyor. Rollers or the like allow gravity to draw the loaded ties to the second, lower end of the conveyor, wherein the first plate 12' comes into contact with first and second rocking loader members 53*a*, 53*b*, each member having a common pivotal axle 54, and an arm having first 55 and second 56 ends, each end having a vertical, upward disposition ending in points 57, 57', and 58, 58' respectively, forming a first, forward point holding mechanism, and second, lower point holding mechanism, respectively.

As shown, rocking loading members are configured relative the gravity conveyor for the plates such that the first, forward points 57, 57' of the rocking loader members 53*a*, 53*b* contacts the plate spike apertures 59, 60 of the first loaded spike, respectively, preventing further migration of the plate and any plates following.

The plates are dispensed individually by the selective, automatic pivoting 62 of said loader members 53*a*, 53*b*, lowering the first, forward points 57, 57', releasing the forward plate 12', allowing said plate to further traverse the gravity conveyor 9. Upon the lowering of the first, forward points 57, 57', the rocking loader members 53*a*, 53*b* are pivoting 62, thereby raising 63 the second, lower points 58, 58'; the system is configured such that the second, lower points 58, 58' are raised into the gravity plate conveyor 9 area so as to intersect with the leading edge of the forward, released plate 12', holding it in place prior to final dispensing into the rail plating area.

As further illustrated in FIGS. 4A, 4B and 8A, 8B, the rocking loader members 53*a*, 53*b* are selectively pivoted 63 via control rod 131 assembly pivotally affixed 134 to one of the two rocking loader members at their first end, as shown in FIGS. 8A and 8B. As shown in FIGS. 4A and 4B, the second end of control rod 131 is pivotally affixed to pivot connection 132, which is affected by and in connection with sprocket 36.

As further illustrated in FIGS. 4A, 4B and 8A, 8B, the rocking loader members 53a, 53b are selectively pivoted 63 via control rod 131 assembly pivotally affixed 134 to one of the two rocking loader members at their first end, as shown in FIGS. 8A and 8B. As shown in FIGS. 4A and 4B, the second end of control rod 131 is pivotally affixed to pivot connection 132, which is affected by and in connection with sprocket 36.

Likewise, as shown in FIG. 4B, when piston 137 is extended downward 39, such as when a tie has been positioned under the template for plating, sprocket 36 is directed in a clockwise direction, directing rod 131 via pivot connection 132 away from the template and plating area, said action translated via said rod to the loading members, lowering the second tips 58, 58', releasing the plate held thereby to be drawn by gravity down the conveyor, dropping in the area of the template cut for said plate for fastening upon the tie, while simultaneously the first tips 57, 57' of the loading members are raised, preventing migration of more than the dispensed tie from the bulk of ties on the conveyor until the next cycle, when the tie is raised, and the cycle begins again.

While the above figures reference the utilization of a control rod (131) for effecting control of the plate dispensing mechanism, it is noted that other suitable means of effecting the plate controls are available, including cables, chains, rotating axles, for transferring the vertical movement of the upper template to actuate the loader members supra, (via the lateral manipulation means), as well as proximity switches situated about the upper template, linked to actuators on the rocking members, are but of a few alternative means for transferring motive power or otherwise initiating plate loading via predetermined template movements.

As shown, rocking loading members are configured relative the gravity conveyor for the plates such that the first, forward points 57, 57' of the rocking loader members 53a, 53b contacts the plate spike apertures 59, 60 of the first loaded spike, respectively, preventing further migration of the plate and any plates following.

The plates are dispensed individually by the selective, automatic pivoting 62 of said loader members 53a, 53b, lowering the first, forward points 57, 57', releasing the forward plate 12', allowing said plate to further traverse the gravity conveyor 9. Upon the lowering of the first, forward points 57, 57', the rocking loader members 53a, 53b are pivoting 62, thereby raising 63 the second, lower points 58, 58'; the system is configured such that the second, lower points 58, 58' are raised into the gravity plate conveyor 9 area so as to intersect with the leading edge of the forward, released plate 12', holding it in place prior to final dispensing into the rail plating area.

Figure 8C:
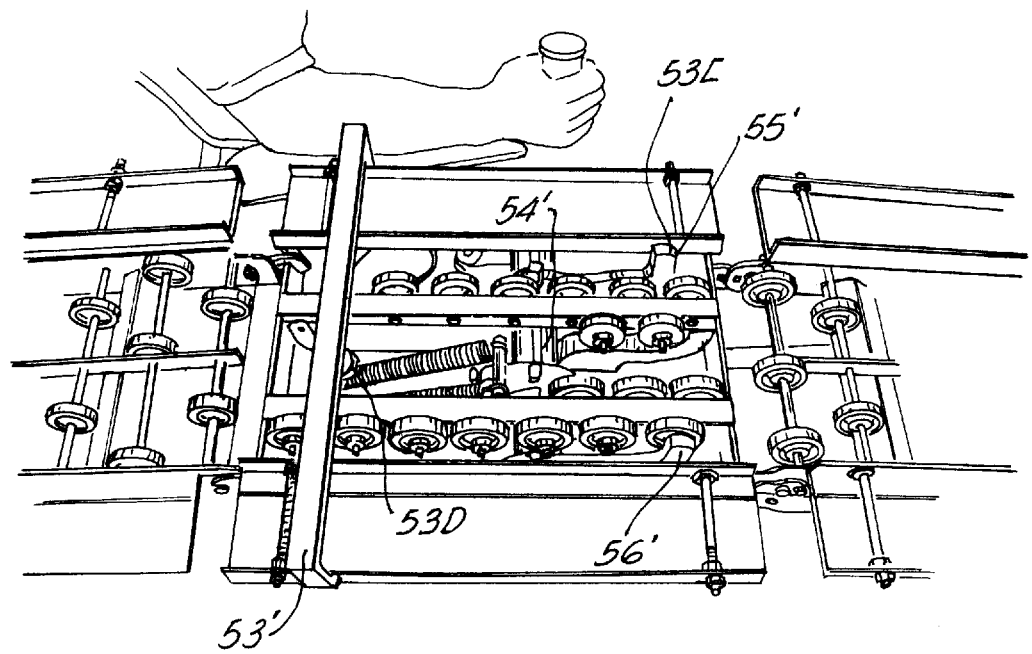
FIG. 8C is an isometric view of the cross-tie pre-plating apparatus of FIG. 1, illustrating an alternative embodiment of the plate dispensing mechanism.
Figure 8E:
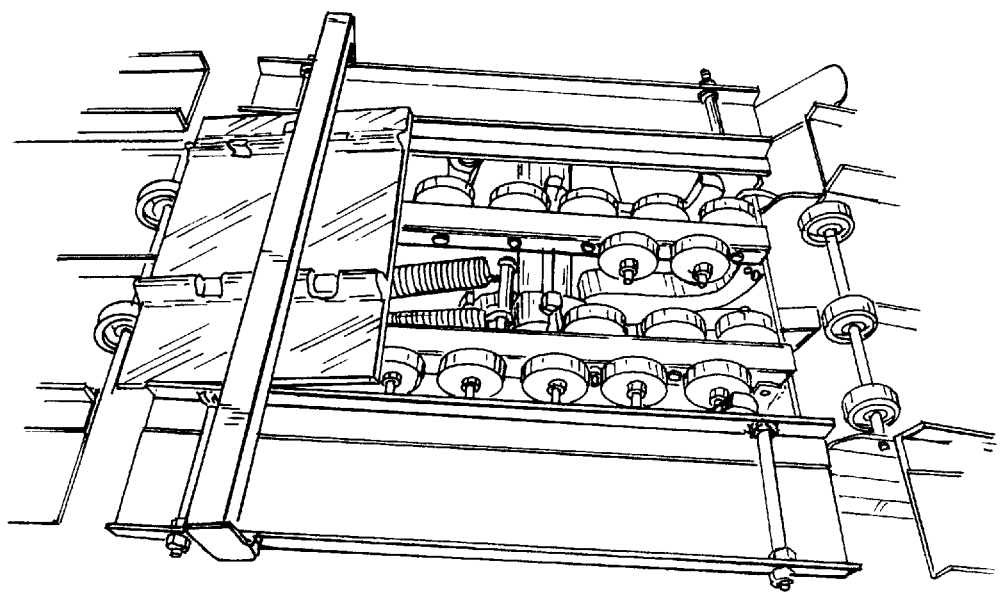
FIG. 8E is an isometric view of the cross-tie pre-plating apparatus of FIG. 8C, with a plate situated thereon, engaging the rear end of the pivotal loading member.
Figure 8D:
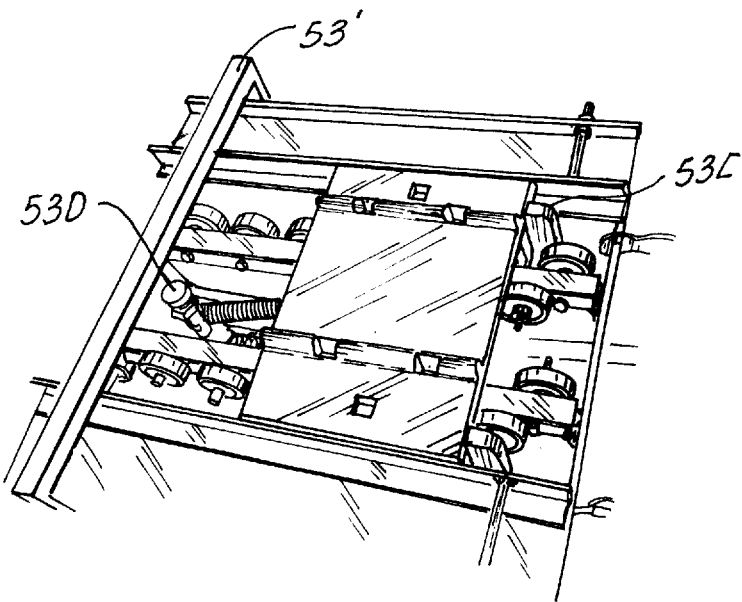
FIG. 8D is an isometric view of the cross-tie pre-plating apparatus of FIG. 8C, with a plate situated thereon, engaging the front end of the pivotal loading member.

An alternative plate loading mechanism is illustrated in FIGS. 8C–8E, wherein, like the above system, the rail plates are loaded upon each conveyor one after another in single tier fashion, from the first, higher end of the conveyor, the conveyor angled at a downward fashion towards the template mechanism. Rollers or the like allow gravity to draw the loaded ties to the second, lower end of the conveyor, wherein the first plate comes into contact with front and rear rocking loader members 53C, 53D, each member having a common pivotal axle 54', the front rocking loader mechanism having first 55' and second 56' arms, each end having a vertical, upward disposition respectively, forming a first, forward holding mechanism, configured to engage the frontal edge of a tie on the conveyor, as shown in FIG. 8D.

The rear rocking loader mechanism in the present, alternative embodiment is configured to frictionally engage the underside of the plate following the next tie to be dispensed, the exemplary embodiment including a relatively flat engagement piece, which may be carbide, for example, for durability, and has situated thereabove a holder bar 53', spaced above the conveyor to allow the passage of a plate therethrough when the rear rocking loader mechanism is in the down position. When the rear loading member was rocked into the up position, however, the engagement piece of said loading member would engage the lower face of the plate, urging same upward and against the holder bar (as shown in FIG. 8E), holding said plate in place on the conveyor while the plate forward on the conveyor is dispensed. Springs may be provided in conjunction with the rear holding piece, as shown, to provided spring pressure against the plate when holding same in place.

To reiterate that already stated infra, while the above figures reference the utilization of a control rod (131) for effecting control of the plate dispensing mechanism, via the lateral manipulation means (FIGS. 4A–4B), it is noted that other suitable means of effecting the plate controls, which could be suitably applied hereto, are known and available, including cables, chains, rotating axles, and proximity switches linked to actuators are but of a few alternative means for transferring motive power or otherwise initiating plate loading via predetermined template movements and are likewise thereby contemplated as alternative means of initiating the plate dispensing mechanism.

Figure 8F:
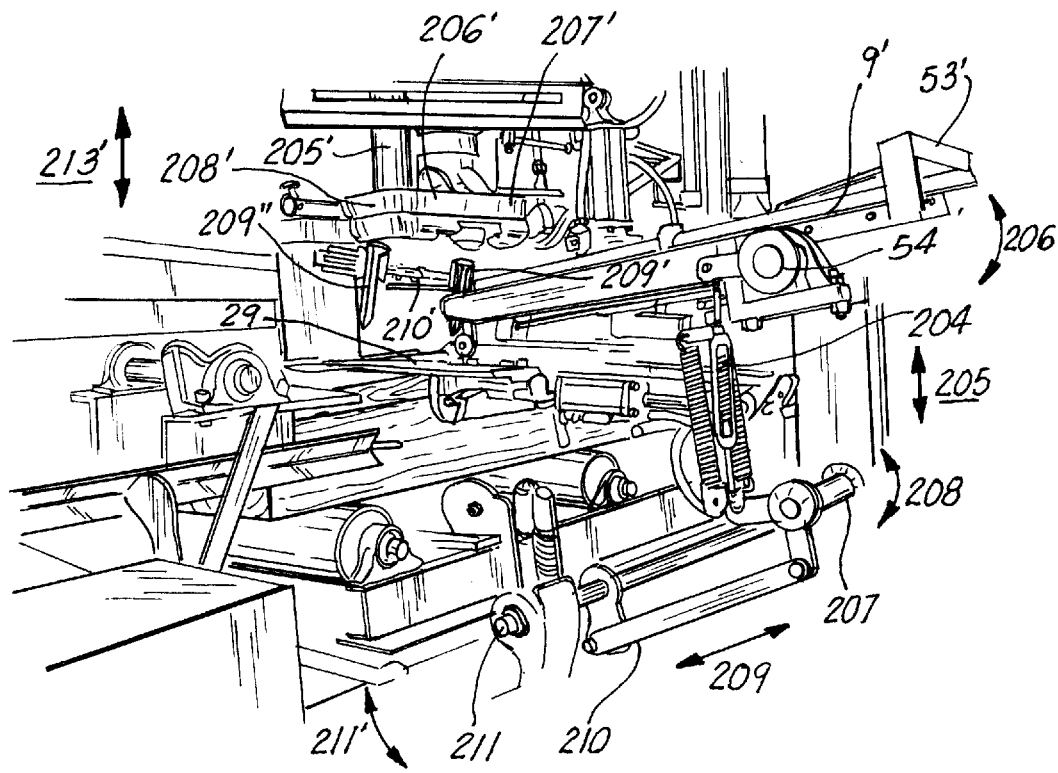
FIG. 8F is an isometric view of the cross-tie pre-plating apparatus of FIG. 8C, illustrating an exemplary mechanical linkage for facilitating actuation of the pivotal loading members of the plate dispensing mechanism with the raising and lowering of the upper template.

For example, FIG. 8F illustrates an isometric view of the plate conveyor 9' of an alternative embodiment of the present invention. This is as opposed to utilizing a straight control rod to translate the vertical movement of the upper template into motive force for operating the rocking loader members of the plate dispenser mechanism, as discussed above regarding FIGS. 4A–4B. Continuing with FIG. 8F, an end view of the pivotal axle 54' of the loader mechanism of FIGS. 8C–8E is shown, further illustrating an alternative means of actuating same, wherein a straight rod is not particularly required to interface between the lateral manipulation means and loader member.

As shown, the pivotal axle rotatingly 206 interfaces with an adjustable control rod 204 which is linearly 205 actuated via pivot member 207, which is rotatingly actuated 208 via control rod 210, which is linearly actuated 209 via main pivot member 211, which has situated thereabout a sprocket or the like having a chain, cable, or the like thereon, which chain interfaces with the upper template 29, such that when said template moves in a vertical direction 213', said movement is translated via chain to main pivot member 211, rotating 211' same, which in turn translates said movement, via the above sequence, to pivotal axle 54'. A rod or the like may be substituted for the chain, above, to translate the vertical movement 213' of said upper template 29 (or the lateral movement of said lateral manipulation means) to rotating 211' movement of said main pivot member 211.

Figure 9A:
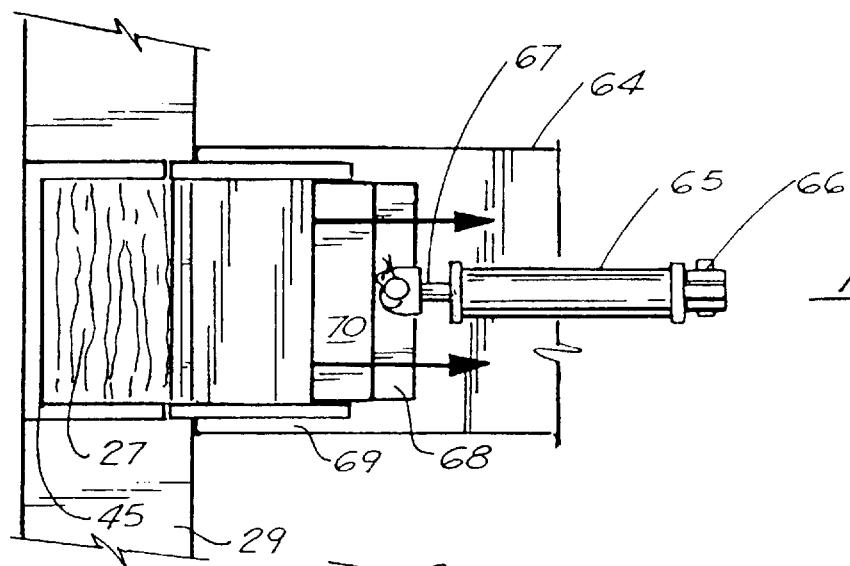
FIG. 9A is a top view of the cross-tie pre-plating apparatus of the present invention of FIG. 1A, illustrating the plate positioning apparatus.
Figure 9B:
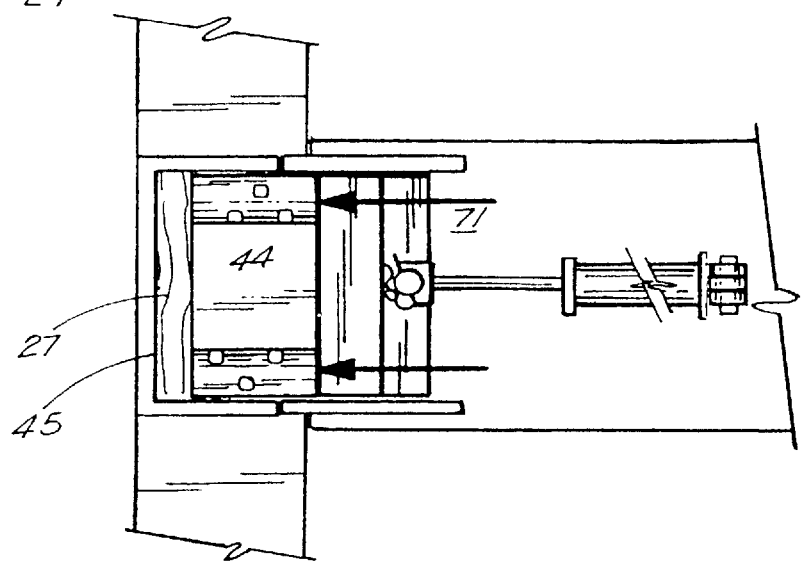
FIG. 9B is an isometric view of the cross-tie pre-plating apparatus of the present invention of FIG. 9A, illustrating the plate positioning apparatus, loading a plate onto the template.
Figure 9C:
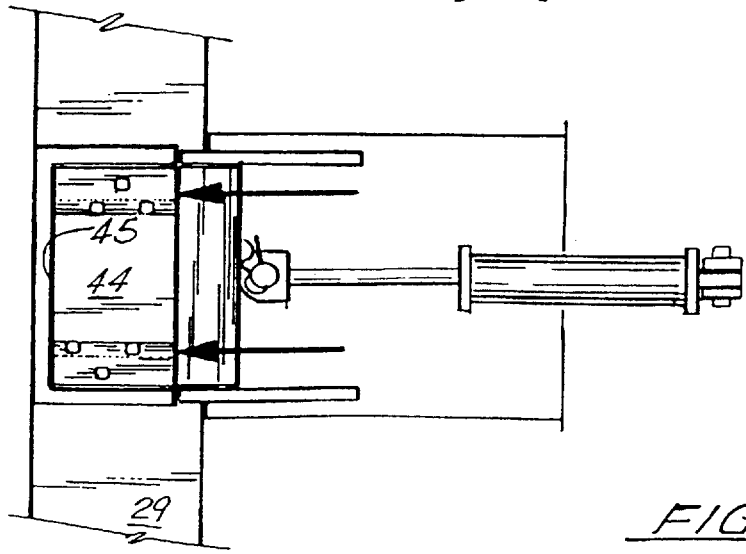
FIG. 9C is an isometric view of the cross-tie pre-plating apparatus of the present invention of FIG. 9B, further illustrating the plate positioning apparatus, loading a plate onto the template.

FIGS. 9a–9c illustrate a plate positioning apparatus provided in conjunction with the first and second template plate slots, for utilization in assisting exact placement of the dispensed plate from the gravity plate conveyors 8,9. These apparatus are each longitudinally aligned and displaced at least in part under each of the respective gravity plate conveyors with which each apparatus operates.

As shown in FIG. 9a, the plate positioning apparatus 64 comprises an operator controlled reciprocating piston 65 having first and second sides, the first end 66 affixed to the platform 7 or an extension of the horizontal conveyor, the second end 67 comprising the moveable piston shaft affixed to a plate manipulation piece 69, configured to engage and manipulate a plate deposited from the respective gravity conveyor, above the apparatus, and position said plate within the plate cut 45 in the template for fastening of the plate to the tie 27. As shown, the piston is aligned so as to provide forward and rearward 70 longitudinal motion of the plate manipulation piece; the piece 69 is itself slidingly engaged 68 to a base member. FIG. 9a illustrates the plate manipulation piece withdrawn to its full acceptance position, ready to accept a plate to be deposited from the above gravity plate conveyor.

As illustrated in FIG. 9b, the gravity plate conveyor has deposited a plate 44, which has come to rest generally aligned with the template plate cut, but short of the appropriate placement. The operator merely initiates the piston, pushing the piston shaft towards 71 and against the outer edge of the dispensed plate 44, pushing same into the template plate cut 45 and over the tie 27.

FIG. 9c illustrates the completion of the installation of the dispensed plate 44 into the template plate cut 46 of template 29; the piston is now ready to be fully withdrawn for driving of the spikes, in order to fasten the plates to the railroad tie. It is reiterated that there is provided in the present system first and second plate manipulation pieces, corresponding to the first and second gravity plate conveyors, and first and second template plate cuts; both of the plate manipulation pieces 65 are configured to be operated by the operator simultaneously after the template is lowered, and the plates have been dispensed by the gravity plate conveyors, as discussed supra.

Figure 10:
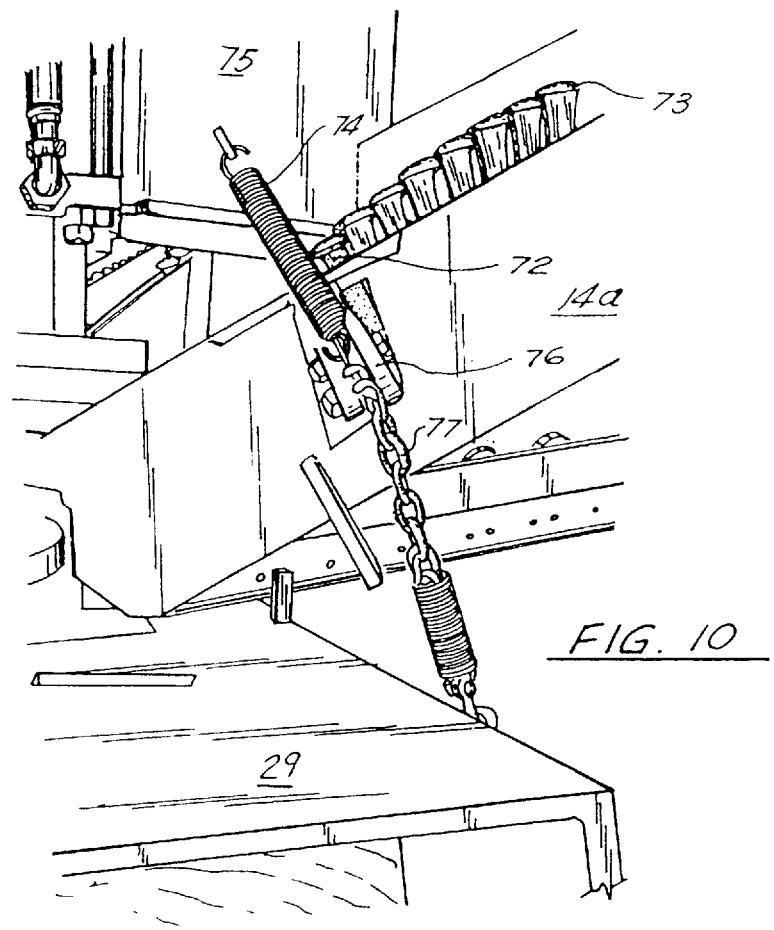
FIG. 10 is an isometric view of the cross-tie pre-plating apparatus of the present invention of FIG. 1A, illustrating the spike feeder and its communication with the template.

As shown in FIG. 10, the spikes in the outer spike feeders are fed utilizing an actuation means in some respects similar to the plate feeder means disclosed in the discussion of 8a,b and 4A,B, in that the actuation is accomplished utilizing bias provided by the vertical, up and down motion of the upper template. As shown, template 29 has affixed to it a spring/chain arrangement 77, the other end of which contacts a pivotal spike feeder mechanism 76, the spring/chain arrangement 77 providing downward bias when the template 29 is lowered.

Also illustrated is upper bias or feed spring 74 having first and second ends, the first end affixed to the template support frame 75, the second end affixed to the pivotal spike feeder mechanism 76, thereby providing upper bias to same. The arrangement of the upper bias or feed spring 74 is illustrative of that utilized on the outer (14a, 13b as shown in FIG. 1A) spike feeders, as the inner spike feeders (14b, 13a in FIG. 1A) do not utilize the template support frame 75 for supporting the upper spring, relying upon a support piece emanating from the spike feeder instead, as will be more fully shown.

As will also be more fully explained infra, the spike feeder mechanisms, comprising four in all, each situated at the lower ends of the gravity spike feeders or conveyors, juxtaposed the plating area, are configured to dispense one spike 72 at a time, while holding back the remaining spikes 73 on the gravity spike feeder 14a.

Figure 11:
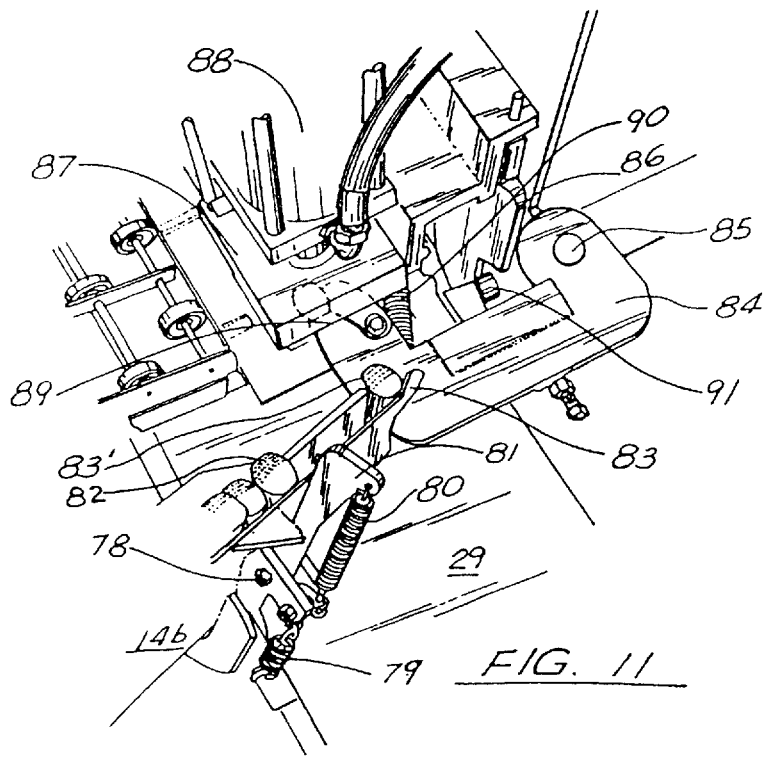
FIG. 11 is a top, isometric view of the cross-tie pre-plating apparatus of the present invention of FIG. 1A, further illustrating the spike feeder, and its communication with the template and spike manipulation arm.

As shown in FIG. 11, the dispensed spike 83' is held in place at the end of the spike feeder 14b via lip 83, exposing the body of the spike as it hangs at the end of the feeder so that it may be grasped and manipulated by the spike manipulation arms 84 magnetic spike holder 89. As shown, the spike manipulation arm 84 is configured to pivot 85 from a spike grasping position, wherein it magnetically grasps the dispensed spike 83, to a spike driving position, wherein it positions the spike over the spike aperture on the rail plate, so that said spike may be driven via piston 88 shaft press 87.

The spike manipulation arm 84 is positioned in its two respective positions, i.e., spike grasping position and spike driving position, via the utilization of a vertical travel manipulation template 86 affixed to the shaft press 87 and which travels up and down with the extension and retraction of said shaft press 87, urging the manipulation arm in the appropriate position in conjunction with the vertical position of the shaft press 87.

Roller 91 affixed to the spike manipulation arm 84, contacts the manipulation template 86, while spring 90 holds the spike manipulation arm in contact with said manipulation template 86. The operation of the spike manipulation arm will be discussed in more detail infra.

Further illustrated in FIG. 11 is spike feeder mechanism 78 as utilized with the inner spike feeders 14b (and 13a in FIG. 1A); as illustrated, these spike feeders operate largely the same as those in the discussion of FIG. 10, supra, except that the upper feed spring 80 is affixed to a spring support piece 81 extending from the spike feeder 14b, unlike the outer spike feeders, whose upper spring support piece is affixed to the template support frame. Other than this difference, the operation is the same; the spike 82 is dispensed based upon the vertical movement of the template 29 via spring/chain arrangement 79, with the upper spring 80 providing the upward bias.

Figure 13:
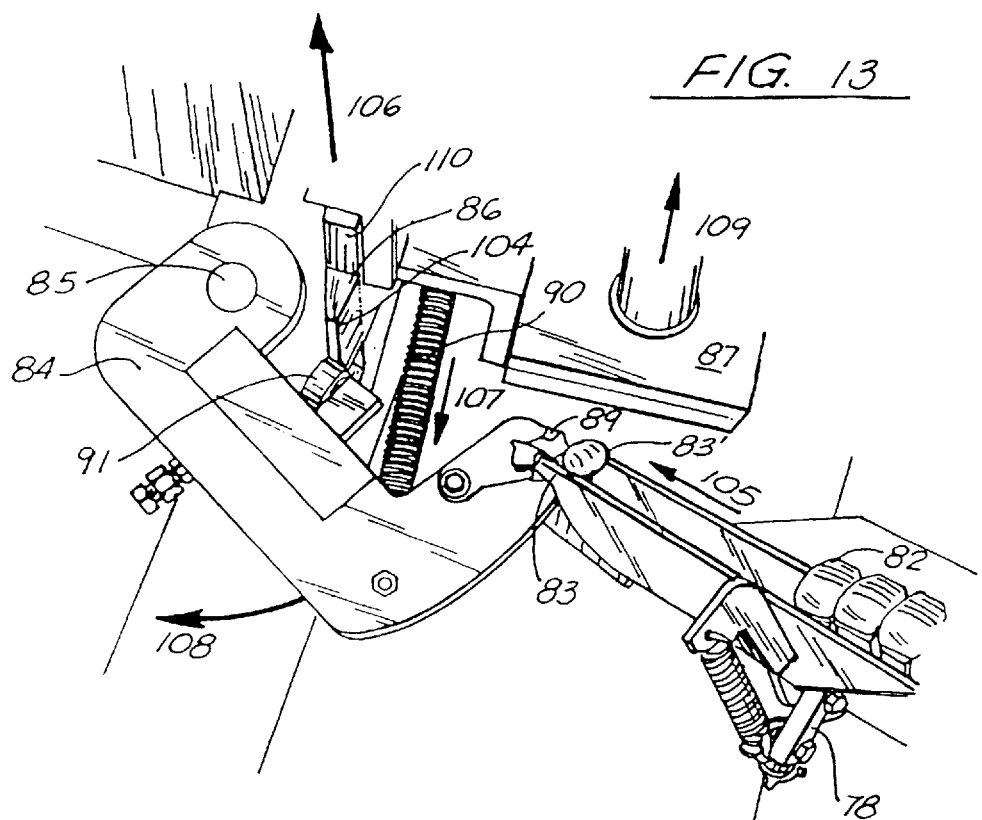
FIG. 13 is an isometric view of the cross-tie pre-plating apparatus of the present invention of FIG. 1A, illustrating the spike manipulation arm grabbing a dispensed spike from the spike gravity feed.

FIGS. 13 and 14 further illustrate the operation of the piston manipulation arms of FIGS. 7 and 11. As shown in FIG. 13, with the piston shaft press piece 87 fully retracted and in its most upward 109 position, the manipulation template 86, being attached to the press piece 87, is also in its most upward position 106. FIG. 15a illustrates the roller 91 and spike manipulation arms 84 position relative the manipulation template 86. At this point, with the shaft press piece 87 at its uppermost, 109 retracted position 112, and the spike manipulation arm forced outwards 113 from the template due to the lower, outer portion 104 of same, the outer portion 104 is configured to urge the spike manipulation arms 84 magnetic spike holder 89 away 108 from the press area and into physical and magnetic contact with the dispensed spike 83 held at the base of the spike feeder via lip 83, grasping said spike via magnetic spike holder 89, as shown in FIG. 13. As further shown, spring 90 urges the spike manipulation arm 84 against the manipulation template, expanding 107 with the outward movement 108 of said arm.

FIG. 14 illustrates the shaft press piece 87 of the piston in its medial position, with said piece 87 about to contact the head of spike 83', held in place for driving into the railroad tie via spike manipulation arm 84. Referring to FIGS. 14 and 15b, spike manipulation arm 84 has been urged with the spike 84 into position via the medially lowered spike manipulation template 86, which has been lowered via its connection with the shaft press piece 87, such that said templates 86 medial cut 110 is in contact with spike manipulation arm 84 and roller 91, urging 111 via spring 90 the manipulation arm 84 to pivot via pivotal connection 85 into the appropriate position for driving the spike 83.

Again referring to FIG. 15b, note that the boundary cuts 104', 111" juxtaposed the medial cut 110 and the lower 104 and top 111 outer template cuts, respectively, are sloped at about 45° to provide for gradual manipulation of the roller 91 and the spike manipulation arm 84 from an extended, outer position to an inner, retracted position, and visa versa.

Referring to FIG. 15c, the template 86 is further provided with an upper, outer cut 111 so as to urge the spike manipulation arm 84 clear of the shaft press piece 87, once said piece has contacted and begun driving the spike, via the continued downward 106 movement of the shaft press piece 87 and connected template 86. As shown, with the continued downward movement 106, the roller 91 and spike manipulation arm 84 moves from the inner, retracted position when said roller is in contact with the medial, inner cut 110 to the outer, extended position, away from the spike driving shaft press piece 87, via said rollers contact with the sloped boundary cut 111", and ultimately the upper, outer cut 111. After the shaft press piece 87 has driven the spike all of the way into the tie, fastening the plate to the tie, the operator then fully retracts the piston, and the apparatus is ready for the next cycle.

Figure 12A:
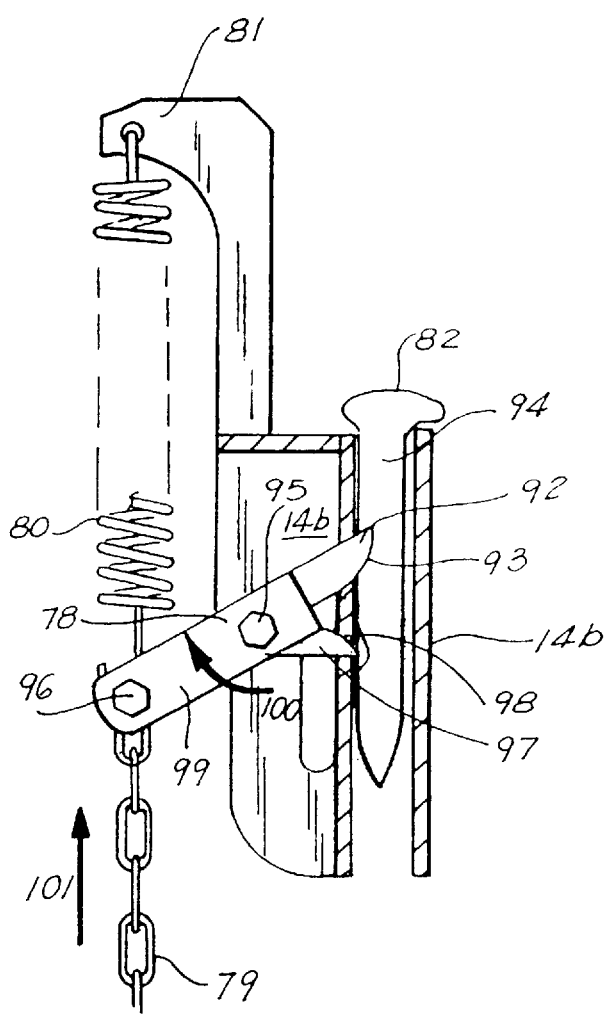
FIG. 12A is a side view of the cross-tie pre-plating apparatus of the present invention of FIG. 1A, illustrating the operation of the spike feeder mechanism of the spike gravity feed.
Figure 12B:
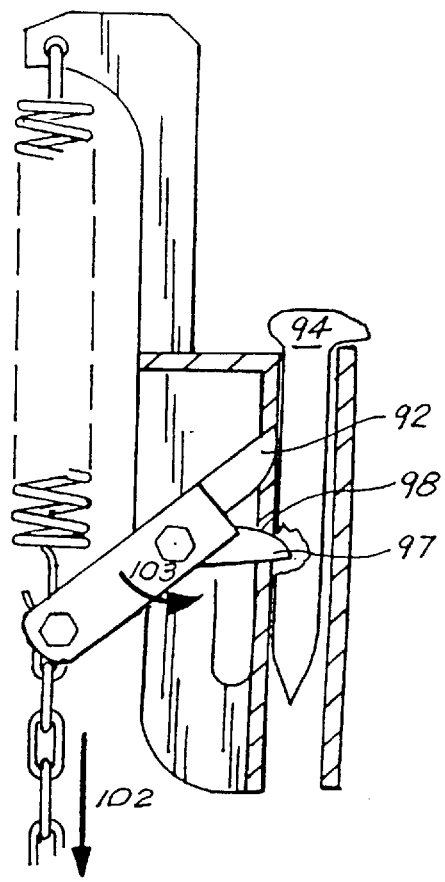
FIG. 12B is an isometric view of the cross-tie pre-plating apparatus of the present invention of FIG. 12A, further illustrating the operation of the spike feeder mechanism of the spike gravity feed.

FIGS. 12a and 12b provide greater detail as to the operation of the spike feeder mechanism 78 of the gravity spike feeders 14b of the present invention; it is noted that the feeder mechanism 78 operates in the same manner for all of the gravity spike feeding systems, including both the inner (14b, 13a in FIG. 1A) and the outer (14a, 13b in FIG. 1A) spike feeding systems.

Returning to FIG. 12a, the spike feeder mechanism 78 comprises front 92 and rear 97, spaced dispenser blades, having an lower 93 and upper 98 blade disposed thereon, respectively. The front 92 and rear 97 blades are spaced such that the front blade 92 holds the spike 82 to be dispensed in place, with engaging the front face 94 of the spike, while the rear blade 97 is configured to hold back the rest of the spikes in the spike feeder 14b while the front blade is raised, the front and rear blades to provide selective dispensing of a single spike with the raising and lowering of the upper template. Thus, the front and rear dispenser blades are spaced so as to allow the passage of a single spike therebetween. As shown, these blades are affixed to an common actuation bar 96, which is configured to pivot via connection 95. Lower feed spring/chain arrangement 79 as discussed supra, is affixed to the upper template at its lower end, and is affixed 96 pivotally to the actuation bar 99 at the other end. When the template is raised 101, the upper feed spring 80, affixed to support piece 81, provides bias to the actuation bar, pulling on same and causing the actuation bar to pivot 99, lowering the front dispensing blade, configured in this position to prevent the migration of spikes from the feeder, while also lowering the rear dispensing blade, configured at this position to no longer block the feeder, allowing the migration of the spikes forward to intersect the now blocking front dispenser blade 92, holding the spikes in place. As the template is raised, a plated tie can now be removed, and an un-plated tie can now be placed under the template and positioned.

As shown in FIG. 12b, once the template is lowered 102; the actuation bar is pivoted in counterclockwise fashion 103, raising the front blade 92 and rear blade 97. The rear blade 97, being spaced the width of a single spike from the front blade 92, said rear blade 97, with its curved, upper blade 98 portion, is cuts between the spike 94 to be dispensed and the next spike, holding the next spike back, while the spike 94 to be dispensed is released by the now raised front blade 92; said spike slides down the remainder of the spike feeder, to the end of the feeder, where it is held for retrieval by the spike manipulation arm for placement in the appropriate position for fastening the railroad plate to the tie.

While the above system contemplates the utilization of a spike feeder system, configured to individually feed a spike to each spike holder, a spike feeder system is not crucial for practicing the present invention, and may be omitted in favor of a manual spike loading system, wherein personnel load spikes onto the spike holders manually.

Such an alternative spike holder/positioning embodiment is shown in FIGS. 8F, and 14A–14B. Referring to FIG. 8F, the present embodiment of the invention includes a template 29 having first and second plate slots, configured to accept and position first and second plates upon the desired upper area of the cross-tie to be plated, respectively. Positioned above said first and second plate slots are first and second hydraulic rams, configured to apply vertical, downward pressure upon spikes positioned by the spike holders, through the spike holes in the respective plates, and into the cross-ties, for affixing the plates to the cross-ties.

As shown in the present drawing, the first hydraulic ram 205' includes an interface member 206' having first 207' and second 208' ends, each end configured to engage first 209' and second 209" spikes, respectfully, said spikes positioned above respective spike holes in a plate situated in a plate slot in said template 29, said spikes positioned and held in place via first spike holder 210'. This is compared to the earlier disclosed embodiment of the invention, which had a separate ram for each spike to be affixed.

Referring to FIG. 14A, which illustrates the second ram, second spike holder area, the second spike holder 212 is shown extended beyond the second ram 213, so as to facilitate manual loading of the spikes into magnetic spike holders 215, 216. The spike holders are spaced to position the spikes above first 223 and second 224 spike holes formed in a plate 222, positioned in the first plate slot 225 upon cross-tie 226, as shown in FIG. 14B.

Returning to FIG. 14A, the spike holders 215, 216 are spaced via adjustable spacer 219B, and each of the holders are formed from a block 217 of TEFLON, high density polyurethane, or the like, which has at least one rare earth magnet or the like situated therein, to facilitate magnetic holding of the front face of each block, which is formed of first 218, and second 218', angled faces, which allows for positioned support of a spike manually placed thereagainst.

In use, referring to FIG. 14B, the cross-tie 226 is situated via the horizontal conveyor under the upper template 29, and the template is then lowered, which causes a plate 222 to be dispensed via loading mechanism initiated by the lowered template, wherein the plate travels via plate conveyor ramp to the plate slot 225 formed in the template. Spikes 228, 229 are then manually loaded onto spike holders 215, 216, respectively, and the ram 213 is initiated to travel in a vertically downward direction 221, which in turn causes, via proximity switch or the like, the reciprocating piston affixed to the rear section of said ram to withdraw the reciprocating piston arm 214, positioning the spike holders 215, 216 generally between the interface member of said ram and the plate to be fastened to the cross-tie.

Figure 14E:
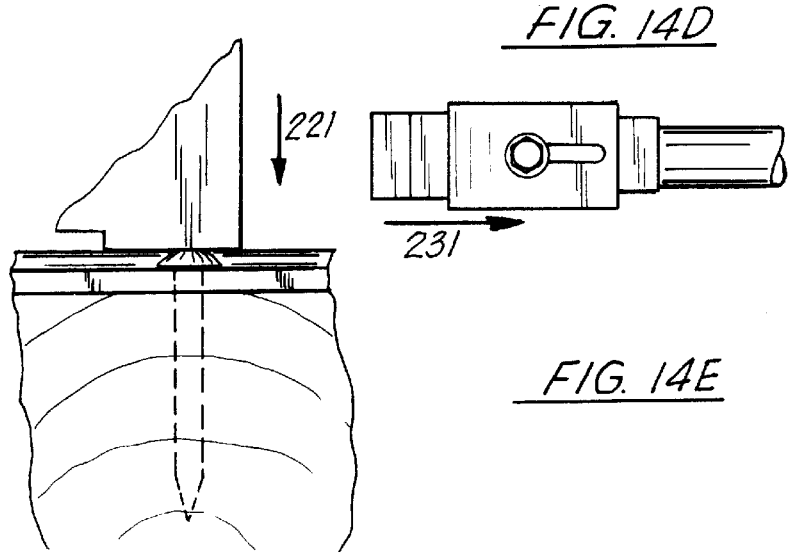

FIGS. 14–14E illustrate in general terms the positioning of the spikes and spike holders during the spike application processes. It is noted that the mechanism illustrated herein is simplified for purposes of clarifying the movement of the components, but nonetheless accurately portrays the sequential movement of the spike holder versus the ram during the spike application process.

As shown, second spike holder 212B positions the loaded spike 228, via the holder 225, over the desired spike hole 231 in the plate 222 to the cross tie 226. Referring to FIG.

14D, the ram then lowers 221, engaging the spike 228 and driving same about ¼–½ inch or more into the cross-tie, at which time another proximity switch may be engaged, wherein, as shown in FIG. 14E, the spike holder is withdrawn 231 via reciprocating piston out of the way so as to avoid being crushed between the ram and the cross-tie, and, once out of the way, the ram is further urged downward 221, driving the spike into the tie, and engaging the plate thereto.

While the above drawings illustrated a side view of the process, showing a single spike, it should be-well apparent that the two spikes shown in the preceding figures are applied to the plate simultaneously, and, in operation, in fact, both plates are affixed simultaneously to the cross-tie, requiring the simultaneous utilization of said first and second rams, each applying a respective pair of spikes to first and second plates, respectively. In addition, it is noted that three, or even four spikes might be installed to a single tie, utilizing first and second spike holders of FIGS. 14A and 14B, for example, with the addition of third and fourth spike holders, positioned via second adjustable spacer, supported via reciprocating piston arm 214. While the present invention contemplates the piston arms as being attached to and laterally emanating from the ram, an alternative embodiment of this invention could have the piston arm 214 otherwise attached to the apparatus, or supported by vertically variable support member, as desired.

Further, as iterated, this alternative embodiment of the spike holder positioning system utilizes proximity switches, sensors or the like, which monitors the position of the rams to control the spike holders via reciprocating pistons, and does not rely upon the vertical manipulation template as discussed above in the earlier embodiment.

Figure 16A:
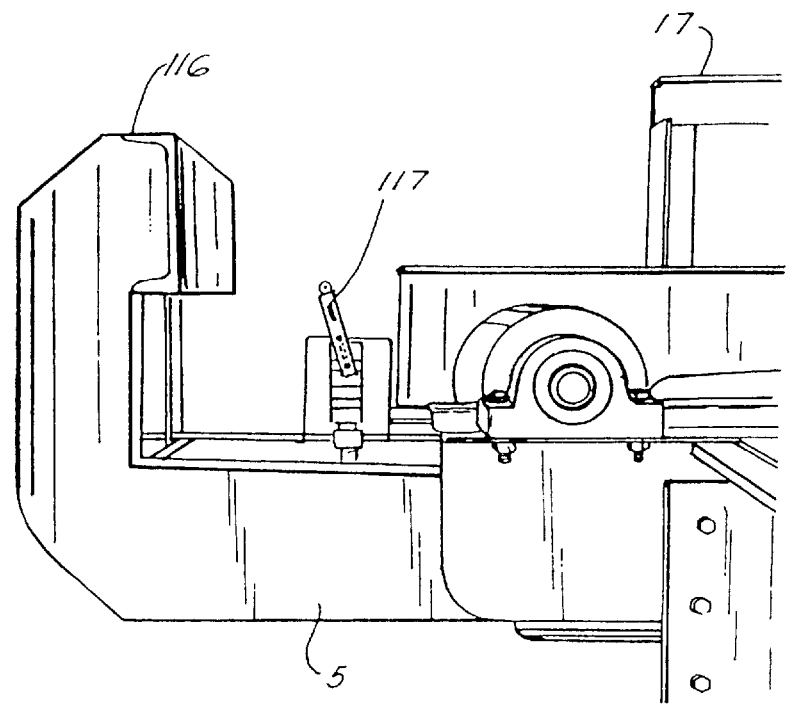
FIG. 16A is a side view of the cross-tie pre-plating apparatus of the present invention of FIG. 1A, illustrating the end of the horizontal conveyor and kicker mechanism associated therewith.
Figure 16B:
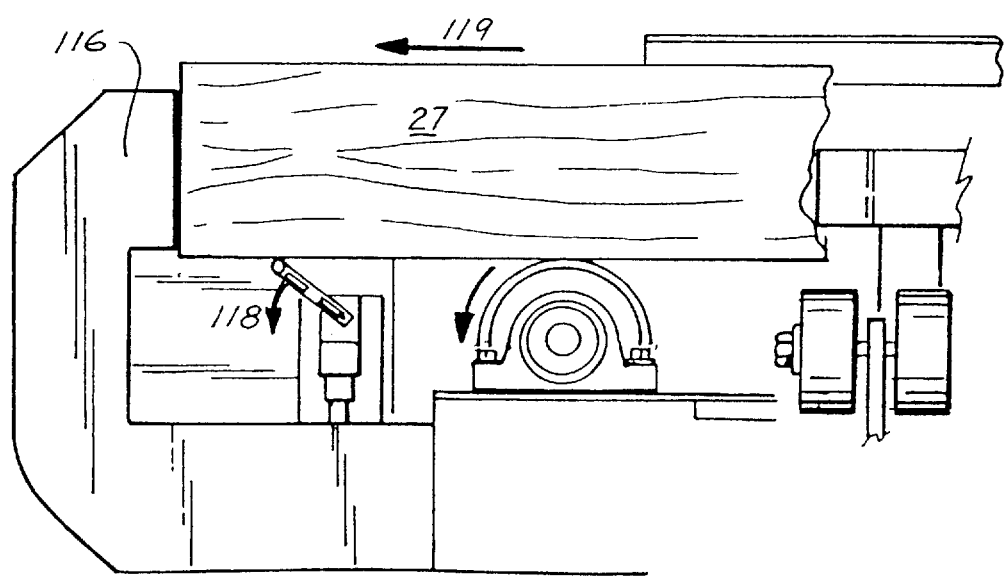
FIG. 16B is a side view of the cross-tie pre-plating apparatus of the present invention of FIG. 16A, illustrating the end of the horizontal conveyor and kicker mechanism associated therewith, further illustrating the initiation of the kicker switch via the dispensed tie.

As illustrated in FIGS. 16A and 16B, after the rail plates have been fastened to the tie as set forth in the specification supra, the processed tie is discharged from the template area via the horizontal conveyor 5, initiates 118 kicker switch 117, until the tie 27 communicates with bumper 116, at which point the tie is in position to be discharged from the horizontal conveyor 5 to the gravity dump conveyor via kicker 17.

Figure 17A:
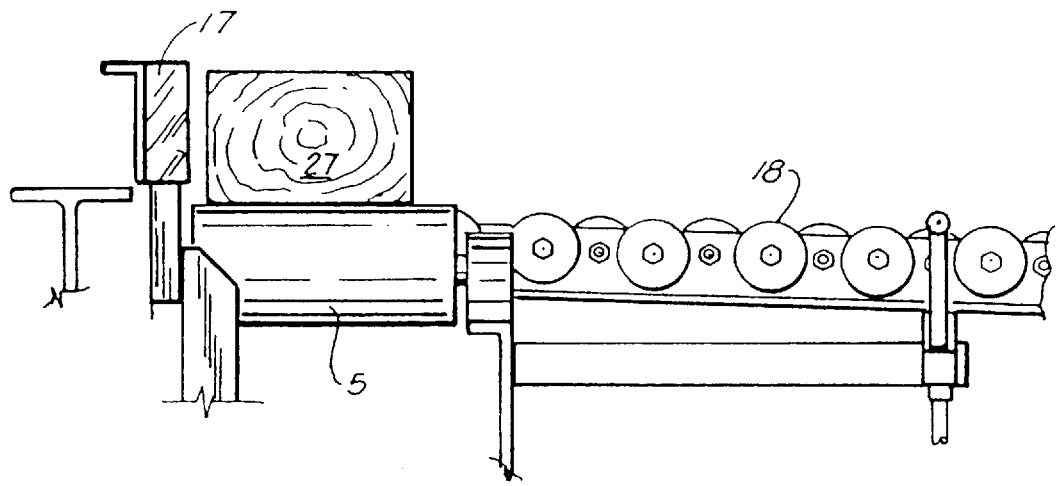
FIG. 17A is an end view of the cross-tie pre-plating apparatus of the present invention of FIG. 1A, illustrating the end of the horizontal conveyor and the gravity dump conveyor connected laterally therewith.
Figure 17B:
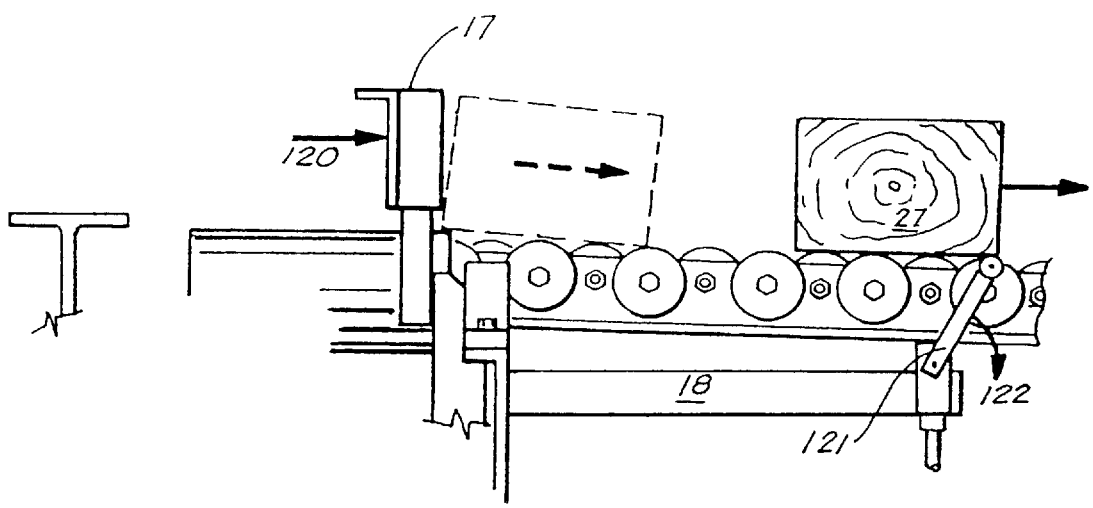
FIG. 17B is an end view of the cross-tie pre-plating apparatus of the present invention of FIG. 17A, illustrating the end of the horizontal conveyor and gravity dump associated therewith, further illustrating the initiation of the kicker dumping the dispensed tie on to the gravity dump.

FIGS. 17A and 17B illustrate the operation of the kicker mechanism at the end of the horizontal conveyor. As shown in FIG. 17A, the kicker 17 is juxtaposed the back wall of the horizontal conveyor 51, opposite the gravity dump conveyor 18. Referring to FIG. 17B, once the kicker switch (118 in FIG. 16B) has been initiated, indicating that the processed tie is in position, a hydraulic piston or the like initiates kicker 17 forward 120, forcing tie 27 on to the gravity dump conveyor 18. The tie 27 is drawn along said conveyor to the lower, opposite end via rollers or the like, passing over actuation switch 121, initiating same 122, thereby re-setting the kicker back to its standby position, as shown in FIG. 17A.

Finally, FIG. 18 illustrates an optional mechanism affixed to the second, lower end 20 of the gravity dump conveyor 18 the mechanism includes first and second ends, the second end the same as the second end of the gravity dump conveyor, said second end including a pivot connection 124 to a frame, with the first end including a liftable piece connected to a reciprocating piston 123 or the like. This apparatus may be the length sufficient to support 6–10 laterally arranged ties, and is particularly useful for discharging a bundle of ties from the gravity dump. As shown, the piston may extend 125 to lift the piece to urge the ties (bundled or unbundled) off of the dump, with the piston retracting 126 upon discharging.

Figure 19C:
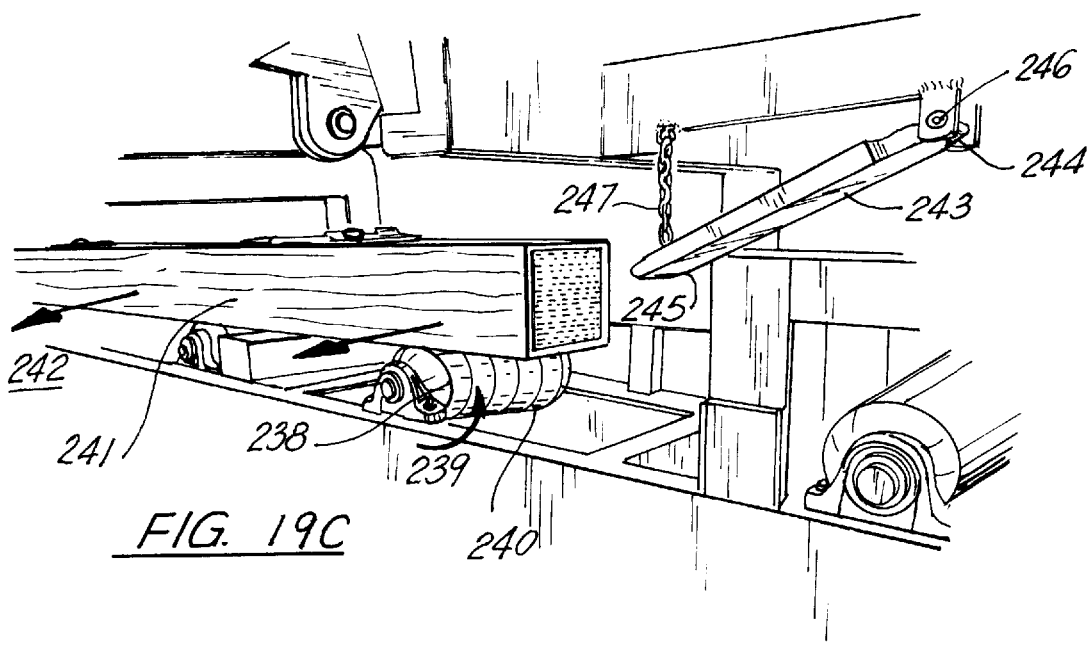
FIGS. 19A, 19B, and 19C illustrate the passage of the plated spike into the unloading area, passing through a one-way mechanism to prevent bouncing back of the tie after colliding with the end of the conveyor, the tie then being urged onto the unloading ramp via worm geared rollers.

Referring to FIG. 19C, in an alternative embodiment of the present invention, the plated cross-tie 241 is directed to the end of the conveyor, wherein It engages end rollers 238 having worm gear-configured threads 240 thereon, the rotation 239 of which urges the cross-tie off 242 the conveyor.

An end stop 243 member may be provided to prevent the cross-tie from bouncing back upon striking the end of the conveyor, the end stop having first 244 and second 245 ends, spaced above the conveyor to allow the passage of the cross-tie thereunder, suspended via pivot 246 and chain 247 connection, respectively.

Figure 19A:
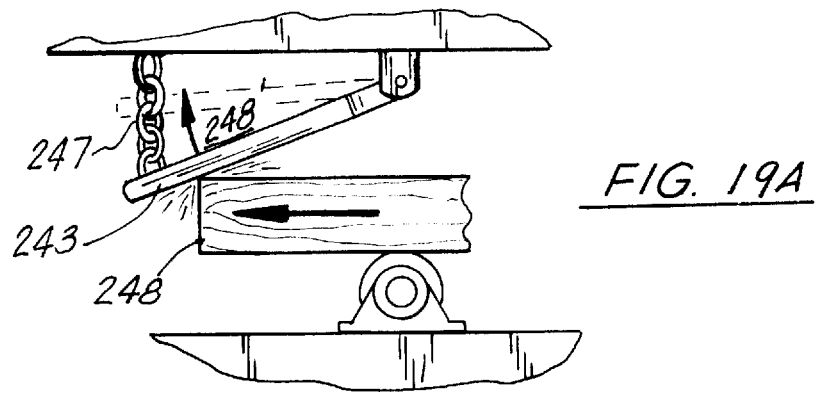
Figure 19B:
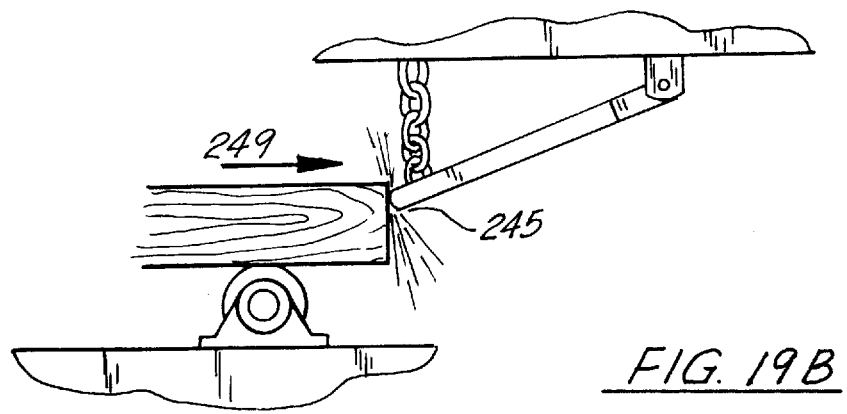

Referring to FIG. 19A, when the cross-tie 248 passes along the conveyor towards the end unloading area, it engages the end stop 243, causing it to pivot upward 248', allowing the chain 247 to take up slack, allowing the passage of the cross-tie thereunder, upon which the stop drops to the original position. Once the tie has passed thereunder, it engages the end of the conveyor unit, wherein the tie may bounce back; to prevent this, the end stop is spaced from the end of the conveyor generally about the length of the cross-tie, such that if said tie bounces back 249, it engages the second end 245 of the end stop, preventing further longitudinal movement of the tie, and allowing the unloading rollers to urge the tie onto the unloading ramp, off of the horizontal conveyor, as shown in FIG. 19B.

FIG. 18A illustrates a top view of a rear-loading version, and alternative embodiment of the invention of FIG. 1, wherein the main horizontal conveyor 249 has first 249' and second 249" ends, and a plating area 250 medially situated therebetween, and a front side having thereon an operating area 252 situated generally in front of the plating area. Situated to the rear of the horizontal conveyor are the cross-tie loading and unloading areas, the loading ramp or conveyor 248 situated generally at the first end, and the unloading ramp or conveyor 251 situated at the second end of the horizontal conveyor.

Also shown is the approximate locations of the stabilizer 253, stop 254, and end stop 255 as earlier discussed above, along the horizontal conveyor. FIG. 18B illustrate a front, isometric view of the invention embodiment of FIG. 18A.

Figure 18C:
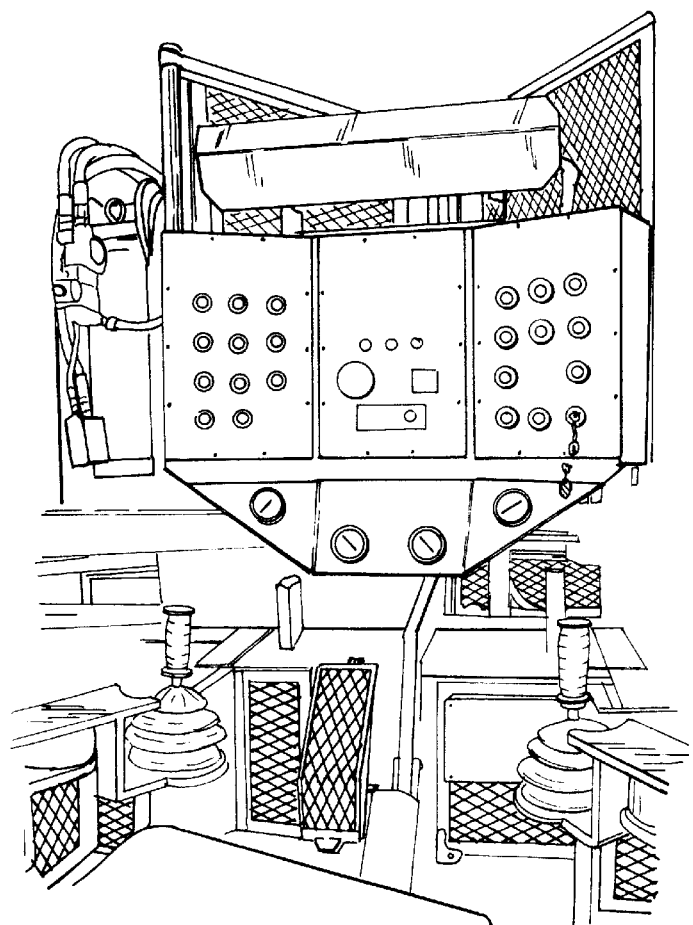
FIG. 18C illustrates an exemplary control station of the invention of FIG. 18A, illustrating joystick controls, and the control panel.
Figure 18B:
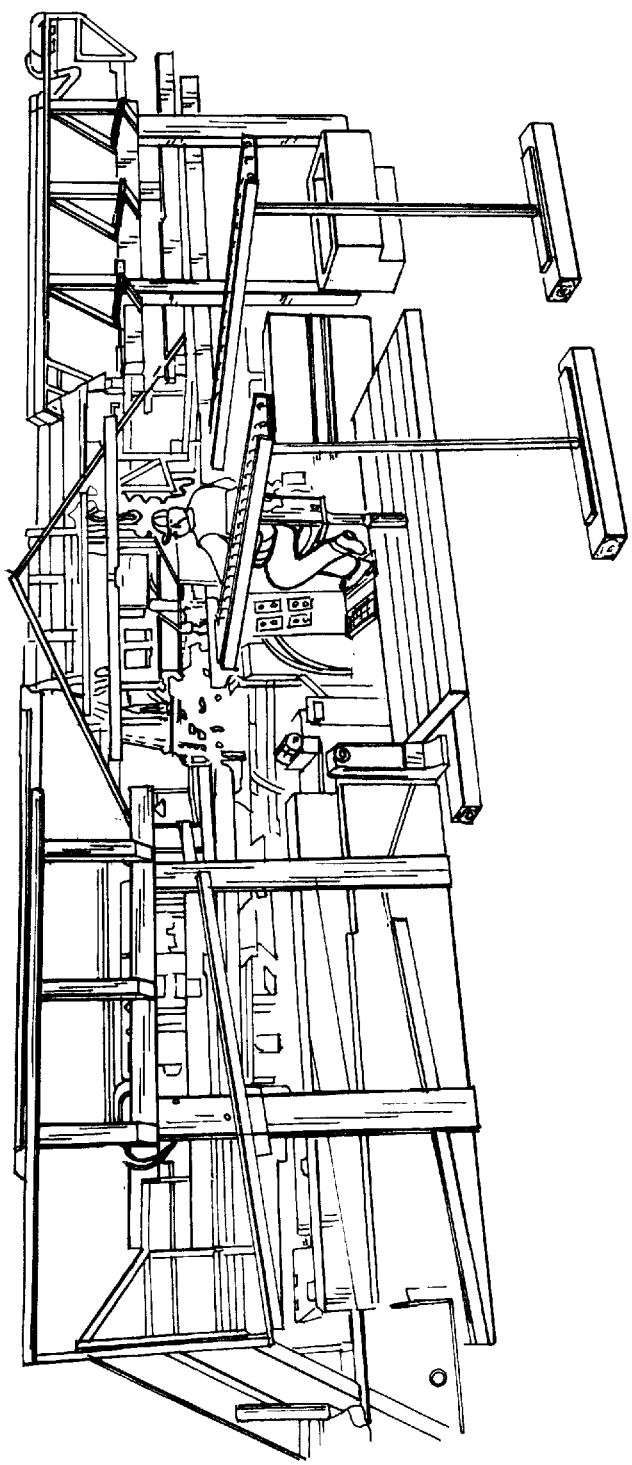
FIG. 18B is an isometric view of the front area of the alternative layout of FIG. 18A.

Lastly, FIG. 18C illustrates an alternative operation station layout, wherein joystick controls are utilized in lieu of hydraulic levers for controlling the present system, and further including an exemplary control board layout.

The invention embodiments herein described are done so in detail for exemplary purposes only, and may be subject to many different variations in design, structure, application and operation methodology. Thus, the detailed disclosures therein should be interpreted in an illustrative, exemplary manner, and not in a limited sense.

What is claimed is:

1. A railroad cross-tie pre-plating apparatus for fastening first and second plates having first and second spike apertures to a cross-tie, comprising:

a central, horizontal conveyor having first and second ends, and a medial area generally therebetween;

a cross-tie dispenser situated in contact with said first end of said central conveyor, said dispenser configured to selectively dispense a single cross-tie onto said central conveyor upon demand;

a pre-plating apparatus juxtaposed said central conveyor, comprising an upper and a lower template, each template having a front side and rear side, and first and second ends, said upper template having disposed thereon vertical manipulation means for lifting or lowering said upper template on demand, said upper template further having formed therein first and second plate cut-outs, said first and second cut-outs arranged to provide the appropriate area for placement of first and second plates, respectively, to a single tie under said upper template, said pre-plating apparatus further comprising:

lateral manipulation means for laterally situating a tie between said upper and lower templates for appropriate positioning under said upper template, first and second plate conveyors having first and second ends, respectively, said first end of said first plate conveyor near the first plate cut-out of said upper template, said first end of said second plate conveyor situated near said second plate cut-out of said upper template, said plate conveyors configured such that a plate dispensed from said first end of first or second conveyor would land on or near the first or second plate cut-out of said upper template, respectively;

plate dispensing means for dispensing individual plates from said first and second plate conveyors automatically, said plate dispensing means comprising first and second pivotal loading members fitted to said first and second plate conveyors, said pivotal loading members having a front blocking member configured to interface with a first plate, selectively preventing the movement of or dispensing said first plate, said pivotal loading members having a rear blocking member configured to interface with a second plate when said first plate has been dispensed, spike driving means for driving said spikes through the dispensed plates and into the dispensed tie;

first and second pairs of spike holders for individually positioning a spike above a respective spike aperture formed in one of said first or second dispensed plates, so that said spike may be driven into the dispensed tie, by said spike driving means, fastening said plate to the tie, said spike holders further comprising a at least one sensor mechanism for engaging said spike holders to move from under said spike driving means, once said spikes have begun being driven into said dispensed tie by said spike driving means.

2. The cross-tie pre-plating apparatus of claim 1, wherein said lateral manipulation means further comprises spring bias having first and second ends, said first end affixed to said rear side of said lower template, said second end affixed to said frame, said spring bias configured to urge said rear side of said lower template towards said frame, said lateral manipulation means further comprising:

a member flexible along its length, having first and second ends and a medial area therebetween, said first end affixed to said front side of said upper template, said second end affixed to said front side of said lower template, and said medial area in pivotal communication about a pivotal member removed from said upper and lower templates, and configured to provide lateral force toward said rear side of said lower template upon the lowering of said upper template, said pivotal member configured to provide lateral force toward said front side of said lower template upon the raising of said upper template.

3. The cross-tie pre-plating apparatus of claim 1, wherein there is further included horizontal manipulation means for horizontally manipulating the dispensed tie, positioning said tie under said upper template in the general horizontal position for dispensing the spikes and plates.

4. A railroad cross-tie pre-plating apparatus for fastening a plate having a spike aperture to a cross-tie, comprising:

a horizontal conveyor having first and second ends, and a medial area generally therebetween;

a pre-plating apparatus juxtaposed said horizontal conveyor, comprising an upper and a lower template, each template having a front side and rear side, and first and second ends, said upper template having disposed thereon manipulation means for positioning said upper template on demand, said upper template further having formed therein a plate cut-out situated to provide the appropriate area for placement of a plate to a cross-tie under said upper template, said pre-plating apparatus further comprising:

lateral manipulation means for laterally situating a cross-tie between said upper and lower templates, for appropriate positioning of said cross-tie under said upper template, plate dispensing means for dispensing a plate, spike driving means for driving said dispensed spike through the dispensed plate and into the dispensed tie, a spike manipulation arm for individually positioning a spike above a spike aperture formed in said dispensed plate, so that said spike may be driven into the dispensed tie, fastening said plate to the tie.

5. The cross-tie pre-plating apparatus of claim 4, wherein there is further included spike dispensing means comprising a pivotal spike loading member fitted to said spike feeders, said pivotal spike loading member having a front blocking member configured to interface with a first spike, selectively preventing the movement of or dispensing of said first spike, said pivotal spike loading members further comprising a rear blocking member configured to interface with a second, following spike when said first spike has been dispensed, said spike dispensing means initiated by a control piece having first and second ends, said first end connected to a pivotal spike loading member, said second end connected to said upper template, such that upward vertical motion of said upper template pivots said pivotal spike loading members such that said front blocking member interfaces with the first spike, and the downward vertical motion of said upper template pivots said pivotal spike loading members such that said front blocking member no longer interfaces with the first spike, dispensing said first spike, and the rear blocking member interfaces with the second, following spike.

6. The cross-tie pre-plating apparatus of claim 4, wherein said lateral manipulation means further comprises spring bias having first and second ends, said first end affixed to said rear side of said lower template, said second end affixed to said frame, said spring bias configured to urge said rear side of said lower template towards said frame, said lateral manipulation means further comprising:

a member flexible along its length, having first and second ends and a medial area therebetween, said first end affixed to said front side of said upper template, said second end affixed to said front side of said lower template, and said medial area in pivotal communication about a pivotal member removed from said upper and lower templates, and configured to provide lateral force toward said rear side of said lower template upon the lowering of said upper template, said pivotal member configured to provide lateral force toward said front side of said lower template upon the raising of said upper template.

7. The cross-tie pre-plating apparatus of claim 4, wherein there is further included horizontal manipulation means for horizontally manipulating the dispensed tie, positioning said tie under said upper template in the appropriate horizontal position.

8. A railroad cross-tie pre-plating apparatus for fastening a plate having a spike aperture to a cross-tie, comprising:

a horizontal conveyor having first and second ends, and a medial area generally therebetween;

a pre-plating apparatus juxtaposed said horizontal conveyor, comprising an upper and a lower template, each template having a front side and rear side, and first and second ends, said upper template having disposed thereon vertical manipulation means for lifting or lowering said upper template on demand, said upper template further having formed therein a plate cut-out situated to provide the appropriate area for placement of a plate to a cross-tie under said upper template, said pre-plating apparatus further comprising:

lateral manipulation means for laterally situating a cross-tie between said upper and lower templates, for appropriate positioning of said cross-tie under said upper template, a plate conveyor having first and second ends, respectively, said first end of said plate conveyor near said plate cut-out of said upper template, said plate conveyor configured such that a dispensed plate would land on or near said plate cut-out of said upper template;

plate dispensing means for dispensing an individual plate from said plate conveyor, said plate dispensing means comprising a pivotal loading member fitted to said plate conveyor, said pivotal loading member having a front blocking member configured to interface with a first plate, selectively preventing the movement of or dispensing said first plate, said pivotal loading member having a rear blocking member configured to interface with a second plate when said first plate has been dispensed, said plate dispensing means operated by a control rod having first and second ends, said first end connected to a pivotal loading member, said second end connected to said lateral manipulation means;

spike driving means for driving said dispensed spike through the dispensed plate and into the dispensed tie;

a spike manipulation arm for individually positioning each dispensed spike above a spike aperture formed in said dispensed plate, so that said spike may be driven into the dispensed tie, fastening said plate to the tie.

9. The cross-tie pre-plating of claim 8, wherein said lateral manipulation means further comprises spring bias having first and second ends, said first end affixed to said rear side of said lower template, said second end affixed to said frame, said spring bias configured to urge said rear side of said lower template towards said frame, said lateral manipulation means further comprising:

a member flexible along its length, having first and second ends and a medial area therebetween, said first end affixed to said front side of said upper template, said second end affixed to said front side of said lower template, and said medial area in pivotal communication about a pivotal member removed from said upper and lower templates, and configured to provide lateral force toward said rear side of said lower template upon the lowering of said upper template, said pivotal member configured to provide lateral force toward said front side of said lower template upon the raising of said upper template.

10. The cross-tie pre-plating apparatus of claim 8, wherein there is further included horizontal manipulation means for horizontally manipulating the dispensed tie, positioning said tie under said upper template in the appropriate horizontal position.

11. The cross-tie pre-plating apparatus of claim 8, wherein there is further included cross-tie unloading means, comprising worm geared rollers at generally the second end of said horizontal conveyor.

* * * * *